US012626049B2

(12) United States Patent (10) Patent No.: US 12,626,049 B2
Attwater et al. (45) Date of Patent: May 12, 2026

(54) SYSTEM AND METHOD FOR AUTOMATIC SUMMARIZATION IN INTERLOCUTOR TURN-BASED ELECTRONIC CONVERSATIONAL FLOW

(71) Applicant: discourse.ai, Inc., Dallas, TX (US)

(72) Inventors: David John Attwater, Southport (GB); Pedro Vale Lima, Oporto (PT); Jonathan E. Eisenzopf, Dallas, TX (US)

(73) Assignee: discourse.ai, Inc., Dallas, TX (US)

( * ) Notice: Subject to any disclaimer, the term of this patent is extended or adjusted under 35 U.S.C. 154(b) by 978 days.

(21) Appl. No.: 17/588,241

(22) Filed: Jan. 29, 2022

(65) Prior Publication Data

US 2023/0244855 A1 Aug. 3, 2023

(51) Int. Cl.
| | |
|---|---|
| *G06F 40/166* | (2020.01) |
| *G06F 3/12* | (2006.01) |
| *G06F 40/20* | (2020.01) |
| *G06F 40/35* | (2020.01) |

(52) U.S. Cl.
CPC .............. *G06F 40/166* (2020.01); *G06F 3/12* (2013.01); *G06F 40/20* (2020.01); *G06F 40/35* (2020.01)

(58) Field of Classification Search
CPC .......... G06F 40/166; G06F 3/12; G06F 40/20; G06F 40/35
See application file for complete search history.

(56) References Cited

U.S. PATENT DOCUMENTS

| | | | |
|---|---|---|---|
| 10,896,670 B2 | 1/2021 | Eisenzopf | |
| 11,165,900 B2 | 11/2021 | Sachedev | |
| 11,463,573 B2 * | 10/2022 | Crowell | G06F 40/30 |
| 11,507,756 B2 | 11/2022 | Lima et al. | |
| 2009/0157709 A1 * | 6/2009 | Kruger | G06F 16/90335 |
| 2018/0183930 A1 * | 6/2018 | Raanani | G06F 15/76 |
| 2019/0171712 A1 | 6/2019 | Eisenzopf | |
| 2019/0172069 A1 | 6/2019 | Eisenzopf | |
| 2020/0143288 A1 | 5/2020 | Eisenzopf | |
| 2022/0309231 A1 * | 9/2022 | Yoon | G06F 40/166 |

OTHER PUBLICATIONS

Groscz, Barbara J.; "Attention, Intentions, and the Structure of Discourse"; Computational Linguistics, vol. 12, No. 3, Jul.-Sep. 1986.

(Continued)

*Primary Examiner* — Richemond Dorvil
*Assistant Examiner* — Ethan Daniel Kim
(74) *Attorney, Agent, or Firm* — Robert H. Frantz

(57) ABSTRACT

A computer-implemented method and computer system improvements for automatically generating a summary note related to a digitally-recorded interlocutor conversation, such as a chat transcript, including accessing a data corpus having at least one digitally-recorded conversation of text-based interlocutory conversation(s) including at least one labeled value, extracting at least one Conversation Feature from the labeled value(s), creating at least one Summary Feature from the extracted Conversation Feature(s), generating at least one Summary Note by combining one or more Narrative Structures with the Summary Feature(s), and digitally outputting the at least one Summary Note.

17 Claims, 30 Drawing Sheets

100

(56)            References Cited

OTHER PUBLICATIONS

Jain et al.; "Story Generation from Sequence of Independent Short Descriptions"; © 2017 Copyright held by the owner/author(s). 123-4567-24-567/08/06. DOI: 10.475/123 4.

Weischedel, et al.; "OntoNotes Release 5.0 with OntoNotes DB Tool v0.999 beta"; Sep. 28, 2012 at http://www.bbn.com/NLP/OntoNotes.

Yang et al.; "Multilingual Universal Sentence Encoder for Semantic Retrieval"; Jul. 12, 2019.

Coenen; et al.; "Understanding UMAP", retrieved on Sep. 29, 2020 from https://pair-code.github.io.

Alammar, Jay; "The Illustrated GPT-2 (Visualizing Transformer Language Models)"; retrieved on Nov. 14, 2020 from http://jalammar.github.io.

Devlin, et al.; "Open Sourcing BERT: State-of-the-Art Pre-training for Natural Language Processing"; Nov. 2, 2018.

Liu, et al.; "RoBERTa: A Robustly Optimized BERT Pretraining Approach"; Jul. 29, 2019.

Yang, et al.; "Language-Agnostic BERT Sentence Embedding"; Aug. 18, 2020.

Garbade, Michael; "Understanding K-means Clustering in Maching Learning"; Sep. 12, 2018.

Mcinnes, et al.; UMAP: Uniform Manifold Approximation and Projection for Dimension Reduction; Sep. 21, 2020.

Tutuorials Point; Machine Learning—Hierarchical Clustering; retrieved on Nov. 14, 2020 from https://www.tutorialspoint.com.

Soricut, et al.; "ALBERT: A Lite BERT for Self-Supervised Learning of Language Representations"; Dec. 20, 2019.

Nguyen, et al.; "Consensus Clusterings"; published by IEEE Xplore on Mar. 12, 2008.

Wikipedia; "OpenAI"; retrieved on Nov. 14, 2020 from htts://en.wikipedia.org.

Ting-En Lin, et al.; "Discovering New Intents via Constrained Deep Adaptive Clustering with Cluster Refinement"; Apr. 3, 2020; retrieved on Feb. 23, 2021 from https://ojs.aaai.org//index.php/AAAI/article/view/6353.

Chen Shi, et al.; "Auto-Dialabel: Labeling Dialogue Data with Unsupervised Learning", Oct.-Nov. 2018; retrieved on Feb. 23, 2021 from https://www.aclweb.org/anthology/D18-1072/.

Zhong, et al.; "Predicting Customer Call Intent by Analyzing Phone Call Transcripts Based on CNN for Multi-Class Classification"; copyright 2019; retrieved on Feb. 23, 2021 from https://arxiv.org/pdf/1907.03715.pdf.

Chatterlee et al.; "Intent Mining from past conversations for Conversational Agent"; Dec. 2020; retrieved on Feb. 23, 2021 from https://www.aclweb.org/anthology/2020.coling-main.366.pdf.

Perkins, et al.; "Dialog Intent Induction with Deep Multi-View Clustering"; Sep. 15, 2020; retrieved on Feb. 23, 2021 from https://arxiv.org/pdf/1908.11487.pdf.

Vedula, et al.; "Towards Open Intent Discovery for Conversational Text"; Apr. 17, 2019; retrieved on Feb. 23, 2021 from https://arxiv.org/pdf/1904.08524.pdf.

* cited by examiner

| Step | System | Root Cause | Event | Behavior | Task | Outcome | % |
|------|--------|-----------|-------|----------|------|---------|---|
| 1 | Billing | | First Bill | Talk to Intelligent Agent | Billing Question | | 20% |
| 2 | Web | | View Bill | Visit Web | Billing Question | | 40% |
| 3 | ACD | | Customer Call | Call Support | Billing Question | | 70% |
| 4 | CRM | Confusion on bill | Agent Disposition | Agent Explains Bill | Billing Question | Billing Question Resolved | 80% |

9301 9302 9304 9303 9305 9306 9307 9308 9309 9310 9311 9312 9313 9314 9315

| Observation | Hypothesis | Business Impact | Recommendation | Value Factor 1 | Value Factor 2 |
|---|---|---|---|---|---|
| Observation 1 | Hypothesis 1 | $5M Cost / Yr | Recommendation 1 | +20% | +$20M / Yr |
| Observation 2 | Hypothesis 2 | $2M Cost / Yr | Recommendation 2 | +30% | +$10M / Yr |

9501    9502    9503    9504    9505

1600

1600'

| Bot Connector | Dashboard GUI 1607 | Data Connector |
|---|---|---|

RESTful API

Knowledge Graph    1605

| Person Ontology | Knowledge Ontology |
|---|---|
| Conversation Ontology | Bot Ontology |

Model Server    1606

| Entity | Phase | Slot | Topic |
|---|---|---|---|
| Outcome | Intent | Turn | Clarification |
| Summary | Promise | Sentiment | Next Turn |
| Next Response | Process | Activity | Event |

| Conversational NLP | Machine Learning |
|---|---|

Conversation Data Ingestion

| Chat Data | ••• | Call Center Data |
|---|---|---|

SYSTEM AND METHOD FOR AUTOMATIC SUMMARIZATION IN INTERLOCUTOR TURN-BASED ELECTRONIC CONVERSATIONAL FLOW

FIELD OF THE INVENTION

This patent application relates to automated systems and methods for summarizing an electronic conversation between two or more parties, and especially to systems and methods which apply artificial intelligence and machine learning to digital conversation data in a turn-based model.

BACKGROUND OF INVENTION

The following patents and patent applications are incorporated by reference in their entireties:

(a) U.S. pending patent application Ser. No. 17/124,005, filed on Dec. 16, 2020, by Pedro Vale Lima, et al.;

(b) U.S. patent application Ser. No. 16/786,923, filed on Feb. 10, 2020, by Jonathan Eisenzopf, now U.S. Pat. No. 10,896,670;

(c) U.S. patent application Ser. No. 16/734,973, which was filed on Jan. 6, 2020, by Jonathan Eisenzopf, now U.S. Pat. No. 11,004,013;

(d) U.S. patent application Ser. No. 16/201,188, which was filed on Nov. 27, 2018, by Jonathan Eisenzopf, now U.S. Pat. No. 10,929,611; and (e) U.S. patent application Ser. No. 16/210,081, which was filed on Dec. 5, 2018, by Jonathan Eisenzopf.

Online conversational text-based communication and interaction systems are growing in popularity as clients of business entities expect to be able to "chat" with business representatives via websites and smartphone application programs at any time of day, any day of the week, any time of year. It was estimated by consulting firm Deloitte in 2017 that 76% of customer interactions occur through conversations, but that 50% of those conversations fail to meet customer expectations, which was estimated to result in $1.6 trillion lost in global revenue annually due to the poor customer experience from these conversations according to the eleventh annual Accenture Global Consumer Pulse Survey in 2016. It is expected by some industry analysts that Artificial Intelligence (AI) can be leveraged to automate a large portion of these conversations, especially through chatbot platforms. The McKinsey Global Institute predicted in 2018 that AI-based conversation platforms that utilize manually supervised deep-learning technology with training from at least 10 million labeled conversation examples would match or exceed the success rate of human-to-human conversations.

SUMMARY OF THE EXEMPLARY EMBODIMENTS OF THE INVENTION

Disclosed herein are one or more example embodiments of a computer-implemented method and one or more computer system improvements for automatically generating a summary note related to a digitally-recorded interlocutor conversation, such as a chat transcript, including accessing a data corpus having at least one digitally-recorded conversation of text-based interlocutory conversation(s) including at least one labeled value, extracting at least one Conversation Feature from the labeled value(s), creating at least one Summary Feature from the extracted Conversation Feature(s), generating at least one Summary Note by combining one or more Narrative Structures with the Summary Feature(s), and digitally outputting the at least one Summary Note.

BRIEF DESCRIPTION OF THE DRAWINGS

The figures presented herein, when considered in light of this description, form a complete disclosure of one or more embodiments of the present invention, wherein like reference numbers in the figures represent similar or same elements or steps.

FIGS. 16A and 16B depict example arrangements of systems, components and interfaces for cognition engines according to a related invention.

DETAILED DESCRIPTION OF ONE OR MORE EXEMPLARY EMBODIMENT(S) OF THE INVENTION

Figure 1:
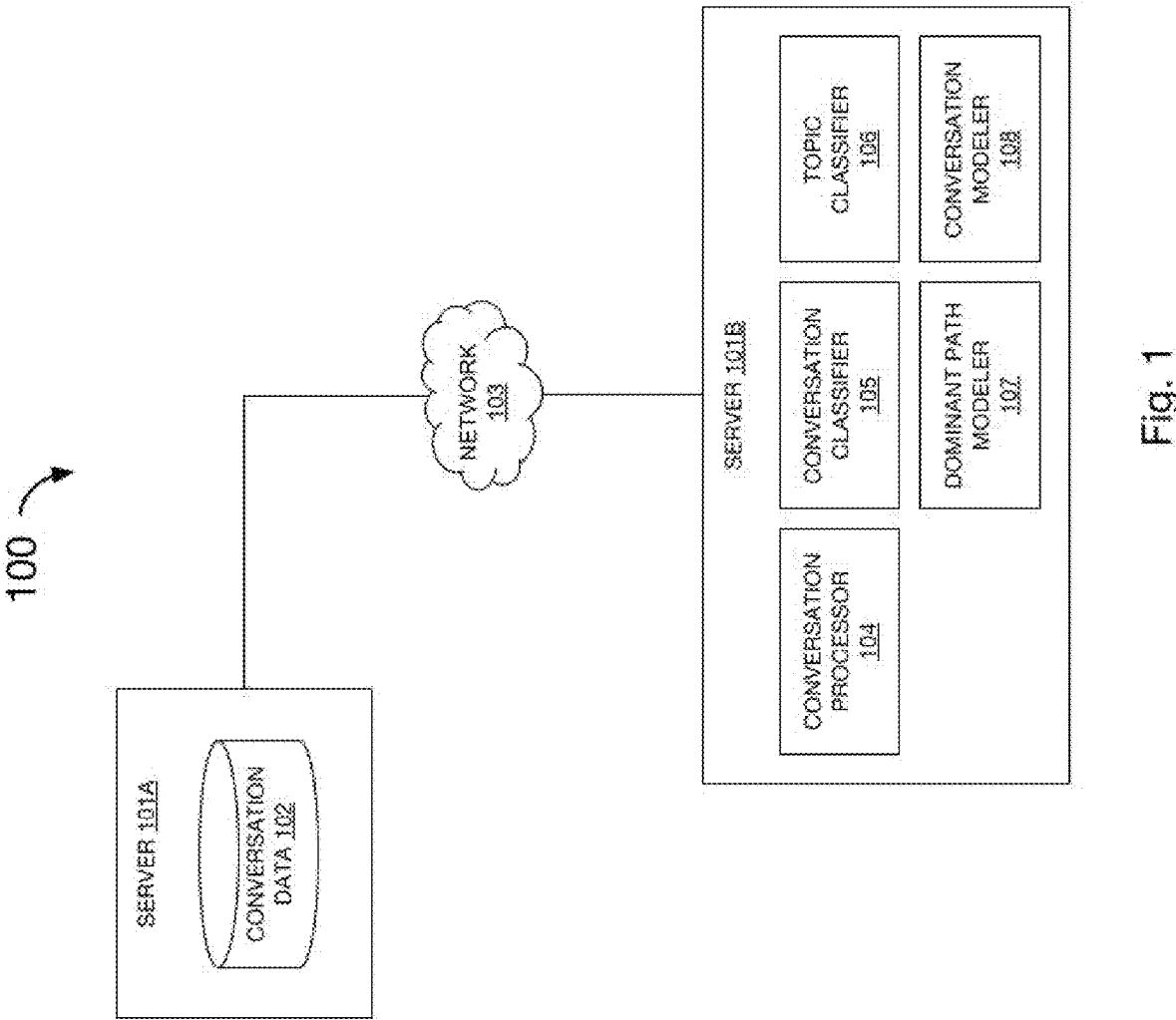
FIG. 1 depicts an improved data processing system and its related components according to at least one embodiment of the invention disclosed in the related and incorporated U.S. patent application Ser. No. 16/201,188.

The present inventor(s) have recognized that existing tools and systems available in the art for exploring large collections ("corpora") of digitally recorded conversations, such as two-interlocutor text messages ("chat" conversations) a lacking in functionality, and do not promote insightful discovery of the most common goals, patterns, flows and results of those collections of conversations.

In particular to the present invention, the inventors have recognized an unmet need in the art regarding the time and resources spent to generate summaries of digitally recorded conversations. Oftentimes, online contact center agents help customers achieve their goals, such as paying a bill, executing a transaction, or shipping a product, using one or more electronic means including but not limited to voice telephone, text messaging, email and web chatting. At the conclusion of a customer conversation, many contact center agents are often required to summarize the conversation in their own words. This information is usually stored in a Customer Relationship Management (CRM) system as notes related to the conversation. These summaries can help the next contact center agent who interfaces to the client to familiarize with previous requests, comments, complaints, information queries, questions, promises and outcomes. These summaries can also be used by supervisors, process flow designers, work flow automation designers and auditors to understand the conversations and outcomes.

The present inventors have recognized that process takes precious agent time and its results are inconsistent from one agent to another. Because of this inconsistency, higher level analysis may not be reliable and benefits to agents subsequently handling contacts from the same client may be limited. The present inventor(s), therefore, set out to develop systems and methods which automatically generate summaries of electronically recorded digital conversations, which can optionally be stored in a CRM system, saving agent time and providing consistent notes.

The related and incorporated patent applications provide useful technologies and processes to accomplish some of this functionality, so the teachings of those patent applications are reviewed in the following paragraphs prior to delving into details of training chatbots using a corpus of interpersonal conversations. It should be noted, however, that although the present invention is disclosed in relationship to these related and incorporated patent applications, other embodiments of the present invention may be realized using similar functionality and similar data output from other products and systems, and that the present invention is not limited to utilization with and integration to only systems that implement the inventions described in the related and incorporated patent applications and patents.

Conversation Segment Classification. At least one of the present inventors realized, as disclosed in the related and incorporated U.S. patent application Ser. No. 16/201,188, hereinafter referred to as the '188 related invention or '188 related patent application, that there was an unmet need in the art of computing and user interfaces to enable a conversational interface through a digital virtual assistant such as a Chat Bot (automated text chat process). Certain improvements were disclosed in the related and incorporated U.S.

patent application Ser. No. 16/201,188 that improved the ease of use of such user interfaces while simultaneously improving the utilization of computing resources such as memory footprint, processing bandwidth, and communications bandwidth to yield higher levels of simultaneously-served users by a single computing platform, thereby reducing the cost of the service to the operator.

The '188 related invention provides certain enhancements and improvements to a data processing system that processes audio, text and/or visual input for a computer interlocutor by creating and using a computer-based and computer-maintained conversation model comprising a plurality of topics comprising a plurality of probable inputs and outputs of a conversation based on a plurality of recorded conversations between a plurality of interlocutors.

The computer interlocutor, according to the '188 related invention, resides on a computer with attached storage and memory that contains one or more processing units. The computer interlocutor creates responses displayed via an output mechanism such as an attached computer monitor or embedded visual screen or audio speaker attached to or embedded in the computer or computing device based on matching user inputs from an input device such as a connected keyboard or microphone attached to a computer or computing device.

Computer-based natural language understanding of input and output for a computer interlocutor is improved using a method, disclosed herein, of classifying conversation segments, which includes one or more of the following computer-performed actions, steps or processes:

a. receiving conversation data from transcribed conversations, such as between two people, an online chat or a text messaging system, a speech recognition system, or a chatbot or voicebot system;

b. splitting transcribed conversations into groups related to a conversation ontology using metadata; identifying dominant paths of conversational behavior by counting the frequency of occurrences of the behavior for a given path;

c. creating a conversation model comprising conversation behaviors, metadata, and dominant paths;

d. using the conversation model to assign a probability score for a matched input to the computer interlocutor or a generated output from the computer interlocutor.

e. receiving a plurality of transcribed conversations comprising a plurality of topics comprising a plurality of inputs and outputs by the interlocutors;

f. accessing and using for rule-based decision making a plurality of metadata related to a plurality of conversations, topics, interlocutors, or related computer systems;

g. receiving conversation data from transcribed conversations between one or more of people, an online chat or a text messaging system, a speech recognition system, and a chatbot or voicebot system (in some embodiments, some users' paths may be given more weight than other users);

h. splitting a plurality of transcribed conversations into a plurality of groups related to a conversation ontology using a plurality of metadata;

i. identifying a plurality of dominant paths comprising a plurality of conversational behavior by counting the frequency of occurrences of said behavior for a given path;

j. creating a conversation model comprising plurality of conversation behaviors, metadata, and dominant paths; and k. accessing and using for rule-based decision making the conversation model to assign a probability score for a matched input to the computer interlocutor or a generated output from the computer interlocutor.

Referring now to FIG. 1, an exemplary improved networked computer environment 100 is depicted according to the '188 related invention. The conversation classifier server 101B is connected to a network 103 and configured such that is it capable of storing and running one or more of the following: a conversation processor 104, a conversation classifier 105, a topic classifier 106, a dominant path modeler 107, and a conversation modeler 108, each of which may be realized by a processor running computer instructions, specialized electronic hardware circuits, or a combination of both. In this exemplary embodiment, another computer 101A is also connected to the computer communications network 103 and contains conversation data 102, which consists of transcribed conversations between two or more human and/or computer interlocutors. In some embodiments, at least one of the interlocutors may be interfaced via an application programming interface (API). In some embodiments, all of the interlocutors may be conducting a dialog within one computer.

Figure 2:
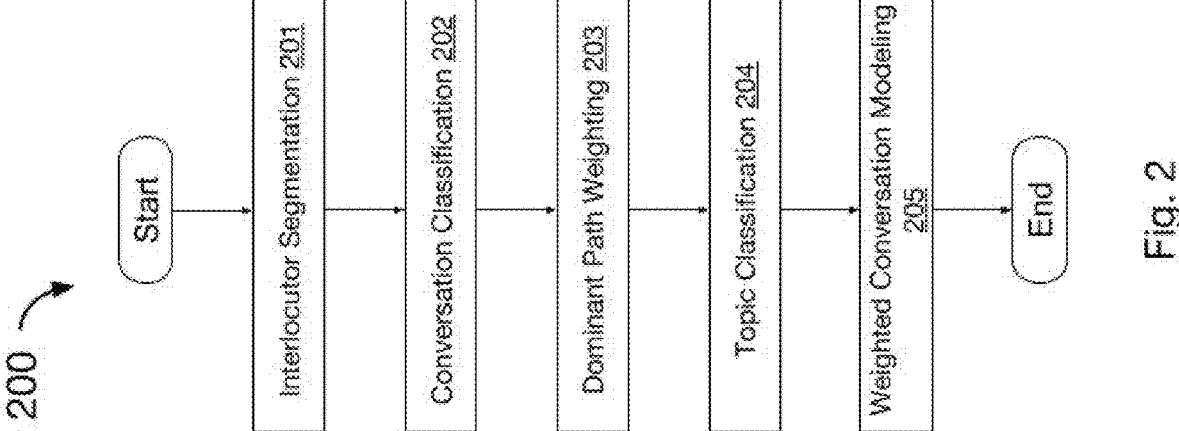
FIG. 2 depicts one or more methods according to the invention disclosed in the related and incorporated U.S. patent application Ser. No. 16/201,188 performed by the improved data processing system to classify a plurality of conversation transcriptions between two or more interlocutors.

Referring now to FIG. 2, exemplary methods used by the data processing system 100 to classify a plurality of conversation transcriptions from conversation data 102 between two or more interlocutors 200 are set forth further reference the exemplary arrangement of computing systems as shown in FIG. 1. The first step of the process is to segment the conversation transcript into turns further categorized by interlocutor 201 which is performed, for example, by the conversation processor 104 and further illustrated in FIG. 3. The conversation is further classified 202 according to a conversation ontology 700 according to conversation class 304. In at least one embodiment, the segmenting of a conversation transcript may be performed manually, according to the conversation ontology described herein, or may be performed at least if not entirely automatically using available third-party dialog act processing systems with suitable control parameters.

Next, conversations are weighted 203 according to the number of path traversals, which is performed, for example, by the dominant path modeler 107. Following the previous step, the data processing system performs topic classification 204 using the topic classifier 106. Topic classification can be performed automatically (unsupervised) using techniques such as keyword analysis thesauri, and natural language processing. Finally, the improved data processing system creates 205 a weighted conversation model 600 as further illustrated by FIG. 6 which can be used by a plurality of computer interlocutor systems to improve input and output performance in a number of ways, including but not limited to:

a. allowing for predictive responses by automated systems in order to handle transactions faster, thereby reducing the computer resources consumed by aggregate transactions and allowing more transactions to by handled by the same amount of hardware;

b. supporting optimized product design and upgrades by identifying and automating the most likely conversation behaviors to target in resource reduction (decrease response time, reduce memory footprint, reduce processor burden, reduce communications bandwidth, etc.); and c. increasing customer affinity for interacting with automated systems by reducing delays between conversation turns which are otherwise unnatural delays when two humans are conversing.

Figure 3:
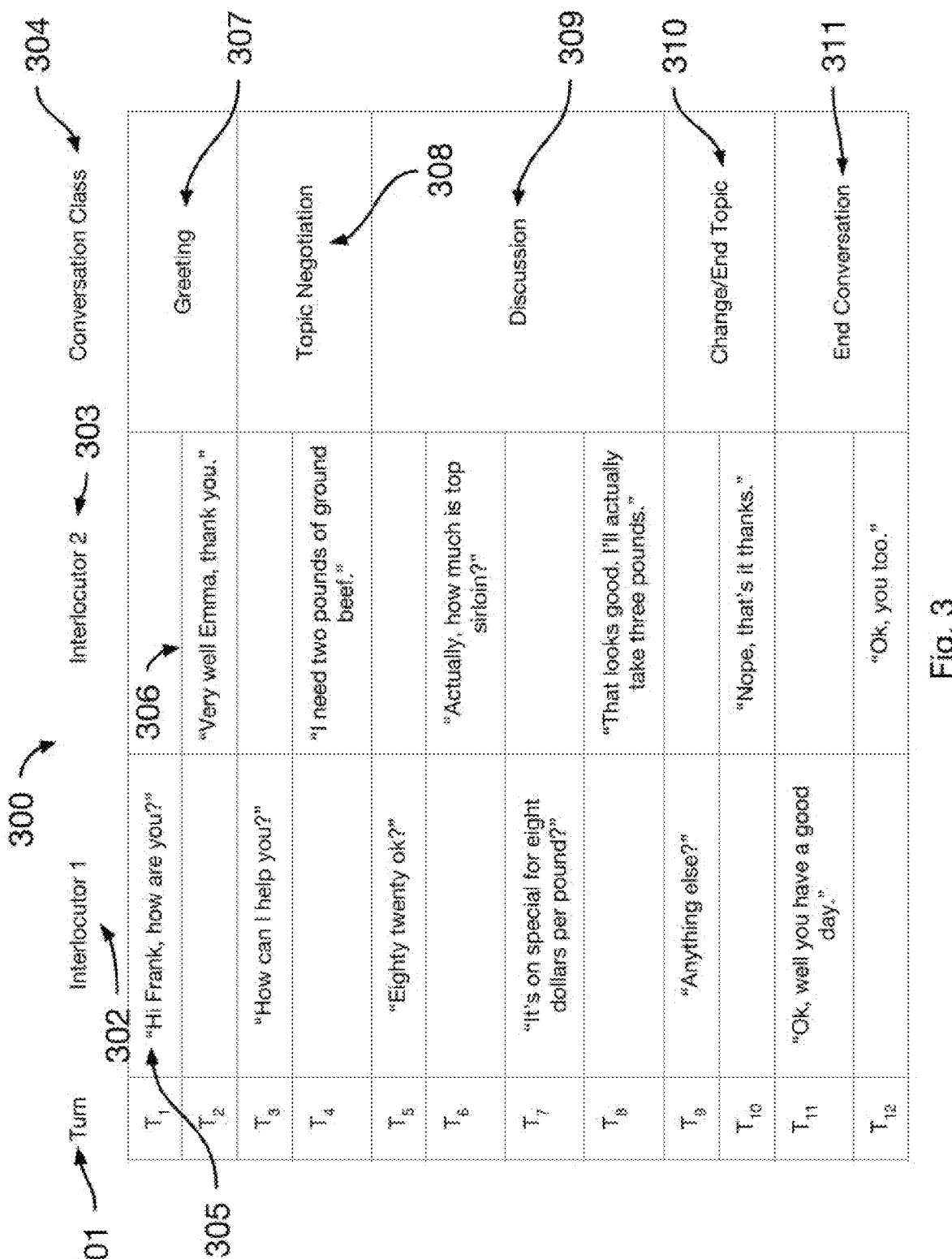
FIG. 3 illustrates an exemplary conversation classification method including splitting a plurality of transcribed conversations between multiple interlocutors into a plurality of conversation segments.

FIG. 3 illustrates an exemplary embodiment 300 of a method for a dominant path weighting 203 and output of the conversation classifier 105. This example includes a series of conversation turns $T_1$-$T_{12}$ 301 by an interlocutor 302 and another interlocutor 303 and further classified into conversation classes 304 which correspond to a conversation ontology 700 as further illustrated in FIG. 7.

The conversation classifier 105 works by examining the text from the interlocutor 305 comprising a turn 301 and further examines the second interlocutor's text 306, which, together and with processing of subsequent text including the turns of the interlocutors, classifies the turns into a conversation class 304. Illustrative of this figure, the conversation classes are greeting 307, topic negotiation 308, discussion 309, change/end topic 310, and end conversation 311.

Figure 4:
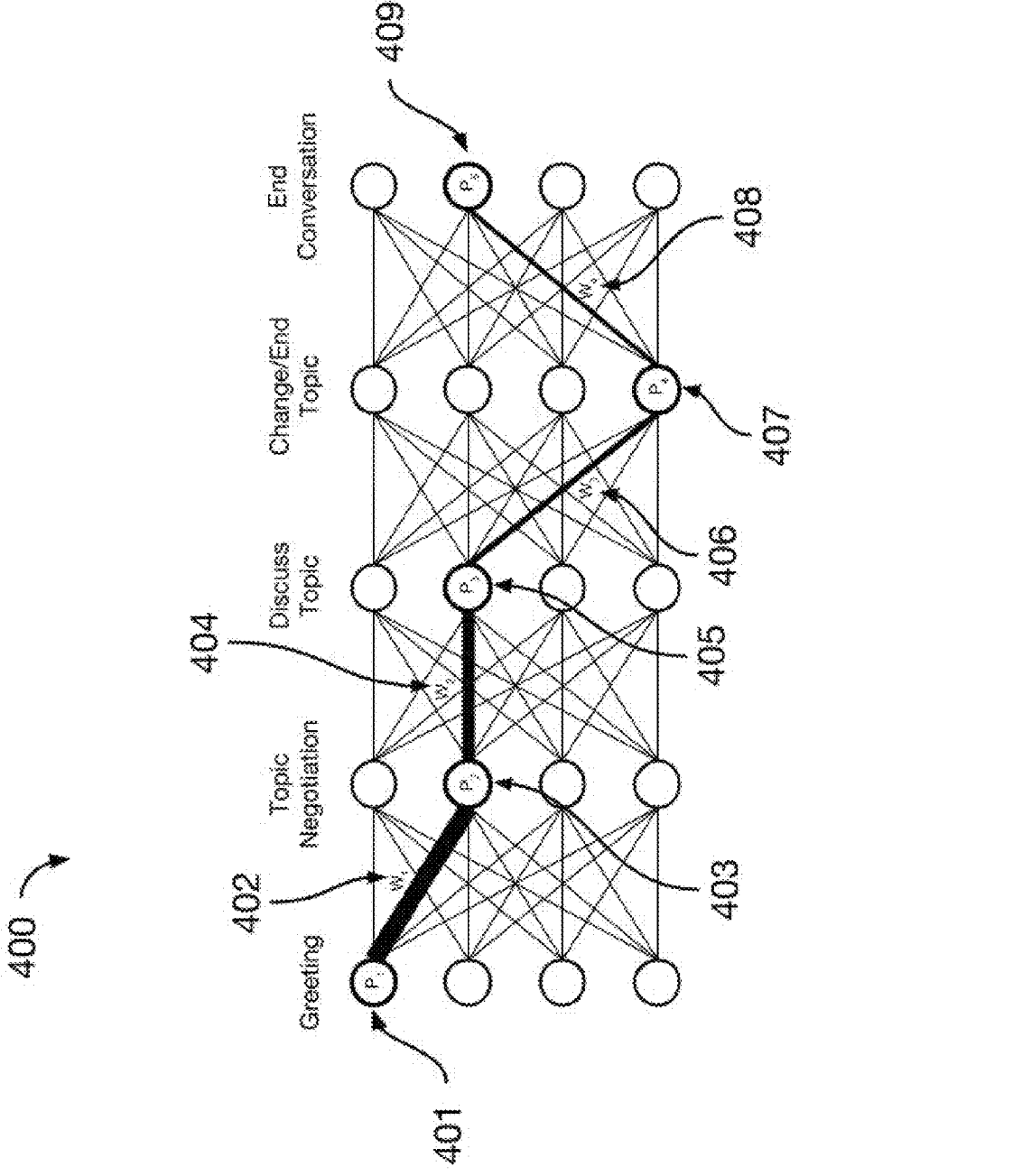
FIG. 4 shows an exemplary embodiment of a method for dominant weighting for a dominant path modeler.

FIG. 4 shows, using a Sankey-like diagram, an exemplary 400 dominant weighting method 203 used, for example, by the dominant path modeler 107 of data processing system 100 based on a plurality of segmented transcribed conversations processed by, for example, the conversation classifier 105 as depicted in FIG. 3. FIG. 4 further illustrates a highlighted dominant path example as produced by the dominant weighting method 203 comprised of a plurality of classified conversations 300. The dominant path model 400 is created, for example, by the dominant path modeler 107. Each step in the dominant path may be representative of a conversation class (304), an interlocutor input, or additional metadata identified by the dominant path modeler. FIG. 4 illustrates a dominant path model and may include a greeting 401, a topic negotiation 403, a topic discussion 405, a change or end of topic 407, and an end of conversation 409 steps (path nodes). The illustrated lines between each element of the dominant path represent the sum of plurality of conversations that traverse each path. The lines or weights (402, 404, 406, and 408) between steps in the paths represent the sums $W_1$-$\underline{W}_N$ of traversals between steps in the dominant path.

Figure 5:
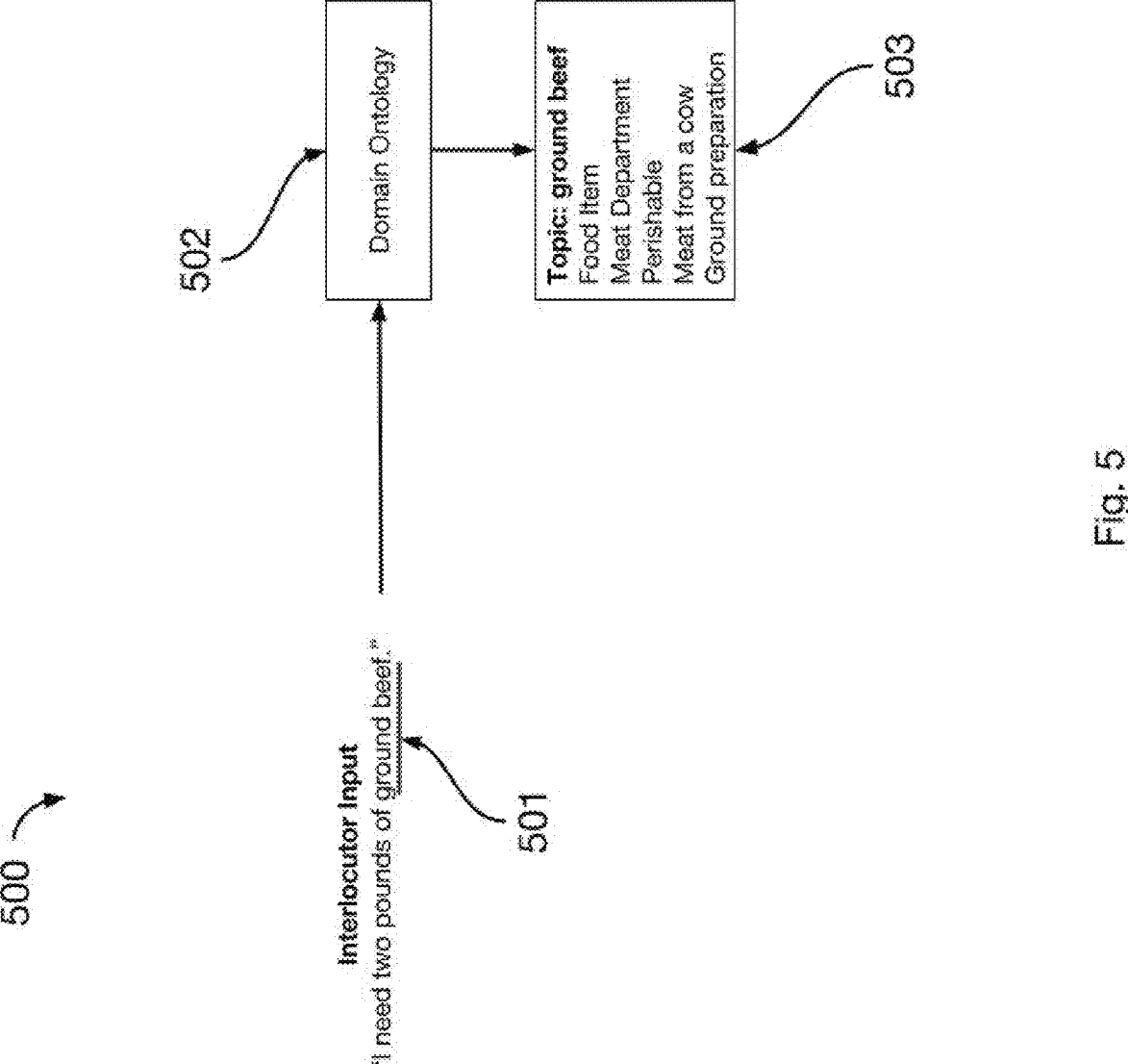
FIG. 5 illustrates an exemplary topic classification method used by a topic classifier to identify the correct topic of conversation.

FIG. 5 depicts 500 an exemplary topic classification method 204 used, for example, by the topic classifier 106 of data processing system 100, and is used to identify the correct topic of conversation based on a plurality of segmented conversations 300 including a plurality of topic negotiation segments 308. FIG. 5 further includes matching interlocutor inputs 501 to a plurality of topics in a plurality of domain ontologies 502 which returns the resulting metadata associated with a plurality of matching topics 503 to, for example, the topic classifier 106.

Figure 6:
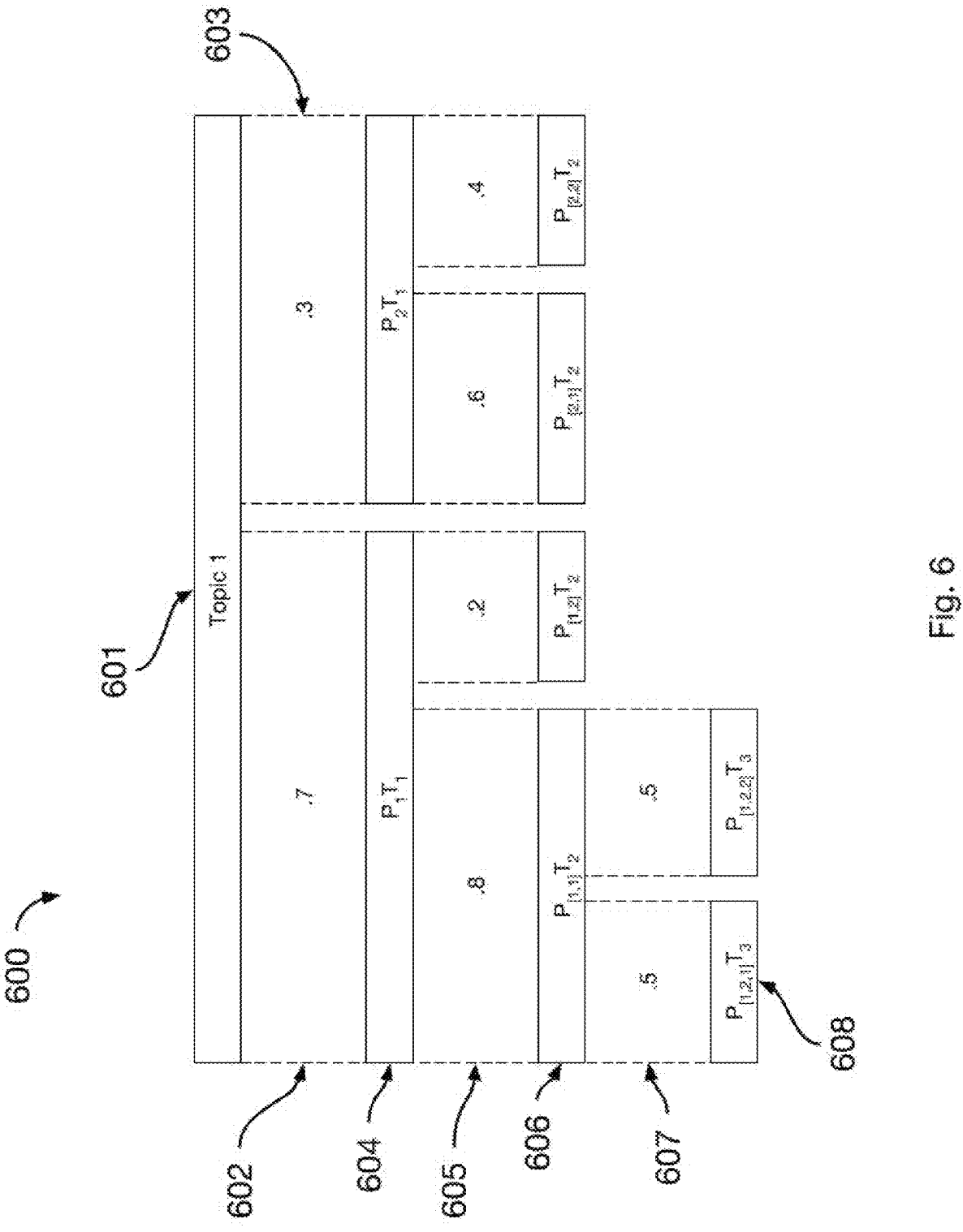
FIG. 6 depicts an exemplary weighted conversation model using a weighted conversation model.

FIG. 6 depicts an exemplary weighted conversation model 600 which is recorded in computer memory in an improved data structure and produced, for example, by the conversation modeler 108 of the data processing system 100, using, for example, the weighted conversation modeling method 205 from a plurality of transcribed conversations for a plurality of identified topics 500. FIG. 6 is illustrative of the weighted conversation modeling method 205 which is produced by the conversation modeler 108 and includes a topic 601 and a plurality of weights 602, 603, 605, 607 associated with a plurality of conversation paths and turns 604, 606, 608. The method of the '188 related invention uses the output of, for example, the dominant path modeler 107 and its associated dominant path weighting method 203 and as previously illustrated in FIG. 4 as input.

Each path segment $P_1$-$P_N$ between turns $T_1$-$T_N$ from a given dominant path model 400 and its associated weights $W_1$-$W_N$ are converted to a corresponding weight in the conversation model 600 such that the percentage of conversation traversals are represented as a percentage of the total traversals from the plurality of processed conversations.

For this present illustration, given a topic 601, weight 602 represents the percentage of processed conversations that have traversed the path $P_x$ for the interlocutor turn $T_y$. Further, weight 603 represents a second dominant path weighting with its associated path and interlocutor turn. Further weights for turns by the interlocutors are similarly represented by 605, 606, 607, and 608 as prescribed by the conversation segments, paths and weights contained in the dominant path model 400. The resulting conversation model as illustrated by FIG. 6 and its associated weights can then be used as by a method to predict the next most likely step in a conversation based upon the current position in the conversation model.

Figure 7:
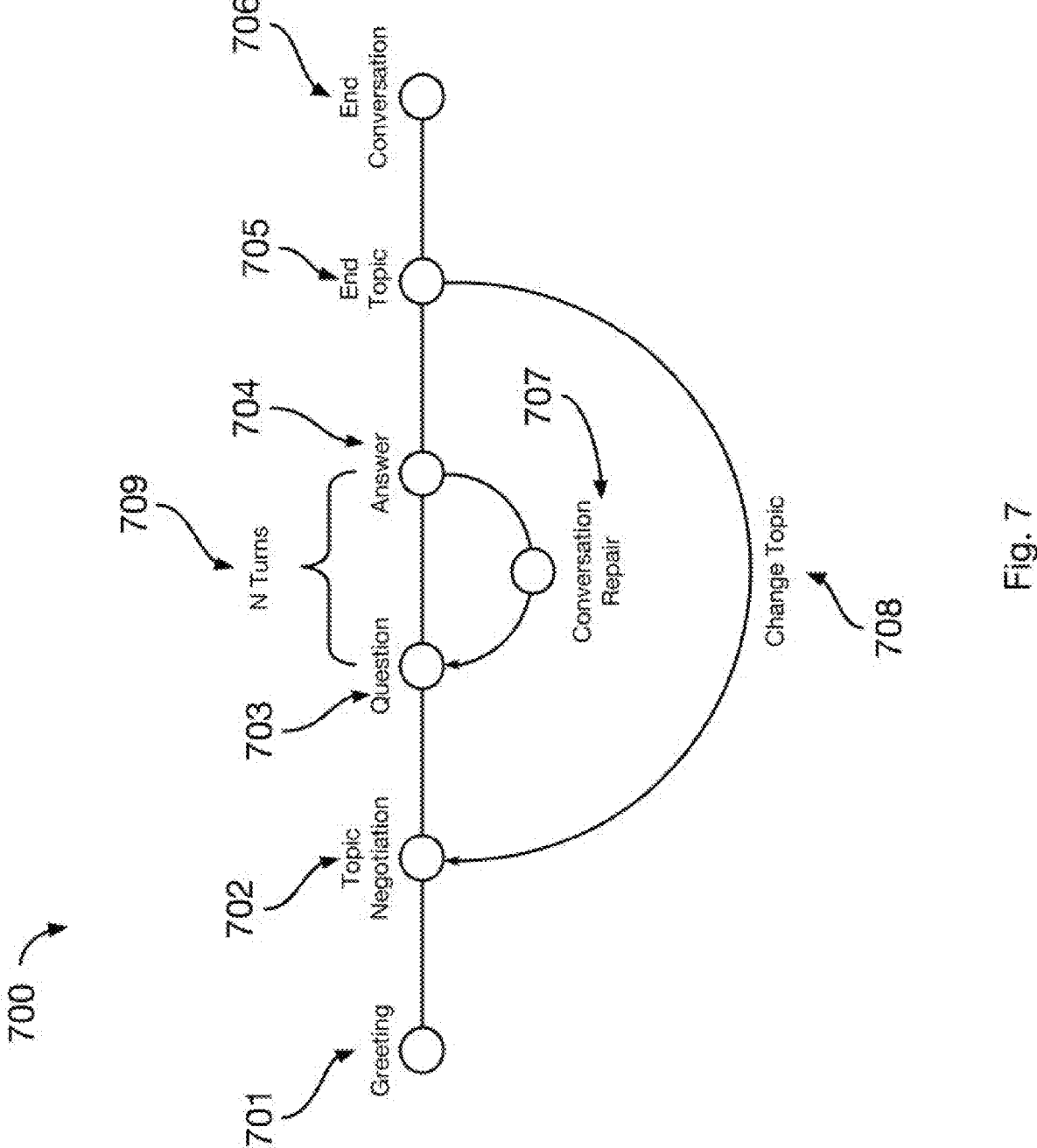
FIG. 7 sets forth an exemplary conversation ontology used to for rule-based decision making to split transcribed conversations into segments for classification by the improved data processing system as disclosed in the related and incorporated U.S. patent application Ser. No. 16/201, 188.

Referring now to FIG. 7, an exemplary conversation ontology is shown using a steampipe-like diagram, which may consist of entities including a greeting 701, topic negotiation 702, a discussion about a topic comprised of a series of turns 709 between the interlocutors that may contain a corresponding question 703 and answer followed by an end 705 or change of topic 708 followed by an end of conversation 706. Conversation repair 707 occurs within a topic when one or both interlocutors exchange turns during which the initial or earlier topic is fine tuned or further refined, but not entirely changed from one domain to another. A plurality of conversation ontologies may be used by the data processing system 100 and one or more of the corresponding methods 200 of the system. Further, an ontology 700 is specifically utilized by the conversation classifier 105 and the associated method conversation classification 203 and as further illustrated by FIG. 3 to segment a plurality of conversations into conversation classes 304.

Figure 8:
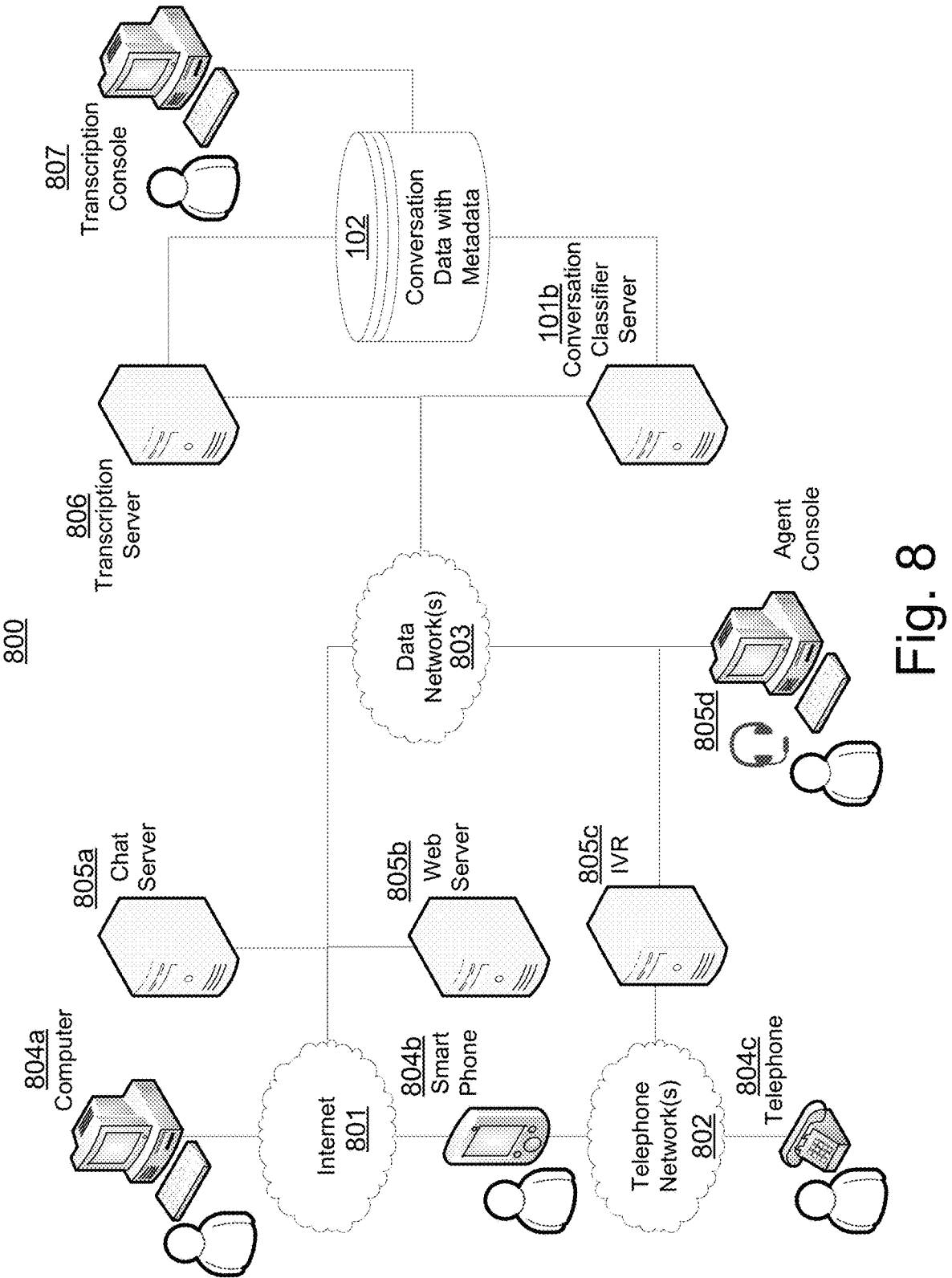
FIG. 8 illustrates an exemplary arrangement of computers, devices, and networks according to at least one embodiment of the invention disclosed in the related and incorporated U.S. patent application Ser. No. 16/201,188.

Referring now to FIG. 8, an exemplary arrangement 800 of computers, devices, and networks according to at least one embodiment of the '188 related invention is shown. A variety, but not exhaustive collection, of interlocutor types are shown, including a computer 804a, such as a personal computer or tablet computer, a smart cellular telephone 804b, a traditional telephone 804c, a chat server 805a, a web server 805b, an interactive voice response (IVR) system 805c, and an agent console 805d, which are interconnected via one or more wired or wireless telephone networks 801, data networks 803, and an internet 801. Two more or more of the interlocutor devices can carry on a dialog or conversation, which can be processed according to the forgoing descriptions. This analysis, as described, yields conversation data with metadata 102, which is created via supervised conversation analysis 807, automated conversation analysis 806, or a combination of both. The conversation classifier server 101b then communicates via appropriate data networks to access the conversation data 102 and perform the forgoing dominant path analysis.

The preceding example logical processes may include computer processing hardware to embody systems according to the '188 related invention; may be coupled with tangible, computer readable memory devices to realize computer program products according to the '188 related invention; and may be embodied as a machine logic method.

The '188 related invention may be realized for many different processors used in many different computing platforms, including but not limited to "Personal Computers" and web servers, running a popular operating systems such as Microsoft™ Windows™ or IBM™ AIX™, UNIX, LINUX, Google Android™, Apple iOS™, and others, to execute one or more application programs to accomplish the computerized methods described herein, thereby providing the improvement to the computer platform as set forth herein.

Dominant Path Analysis and Determination. At least one of the present inventors realized, as disclosed in the related and incorporated U.S. patent application Ser. No. 16/210, 081, hereinafter referred to as the '081 related invention or '081 related patent application, that there was an unmet need in the art of computer-assisted business process analysis. Certain improvements we disclosed in the '081 related patent application improved the computer-based analysis tools through particular user interface enhancements and logical process improvements, while simultaneously improving the utilization of computer usage of computing resources such as memory footprint, processing bandwidth, and communications bandwidth to yield higher levels of simultaneously-served users by a single computing platform, thereby reducing the cost of the service to the operator.

At least one of the present inventors realized, as disclosed in the '081 related and incorporated patent application, that the number of projects that even the largest companies can complete in a year is limited due to the manually time intensive effort required, often across multiple departments. These engagements may involve tens of resources for several months whilst data is collected, analyzed, and reviewed by experienced practitioners. Hypothesis generated from executive interviews, observations, and computer generated reports often must be properly validated to achieve a reasonable degree of reliability in order for the business to decide to invest in the associated project and business plans. And, because the time-consuming nature of the data gathering, data preparing, and analysis, businesses struggle to respond in real-time to changes in customer desires and behaviors.

While businesses and organizations had adopted tools such as central customer database systems and financial forecasting tools to reduce the effort of such engagements, data sets often came and still come from non-integrated disparate sources, requiring additional database and programming efforts at the beginning of the engagement.

Further, even with integrated data sets, the process of conducting root cause analysis, validating assumptions, creating hypothesis or conversation models largely rely upon the practitioner(s) who have experience conducting such analysis and can quickly identify relevant problem/opportunity patterns. Lastly, by the time the results have been completed following months of analysis, business factors may have changed such that the results and assumptions are less relevant.

Based on these realizations, at least one of the present inventors has recognized that there is an unmet need in the art for improved and enhanced computer functions to detect, analyze, illustrate, and report customer behaviors while interacting with a business enterprise and the technology that represents the enterprise, to recommend responses to those behaviors to improve the outcomes experienced by the customer, and to measure the change in those behaviors and outcomes to verify or invalidate the modifications to the enterprise.

As disclosed in the '081 related invention patent application, the inventor devised an improved data processing system that continuously analyzes and automates a process of identifying statistically significant patterns of customer behavior linked to a specific set of customer outcomes and presenting these visually in a graph with linkages to the root causes, customer events, each step in the customer behavior, and the customer outcome. The improved computing system of the '081 related invention provides a set of hypotheses and recommendations based on the pattern matching solutions in a computer database and allows the user of the system to simulate the anticipated outcomes.

In the discussion of FIGS. 9-13, the blocks and arrows represent the relationships between the improved data processing systems and the customer behaviors and process flows that are relevant to identifying common customer behavior patterns that correlate to business and customer outcomes and relate to a given set of root causes, according to the methods and processes of the '081 related invention. The '081 related invention pertains to a method and system automating a process of identifying and analyzing the relationships between root causes that drive events that cause customer behaviors related to a business or customer outcome that is typically composed of one or more tasks. As such, various embodiments according to the '081 related and incorporated patent application are able to automatically and continuously, in real-time in some embodiments, analyze these relationships and to then make specific observations and recommendations based on an expert database, thereby reducing the time a cost of conducting this analysis manually.

Figure 9:
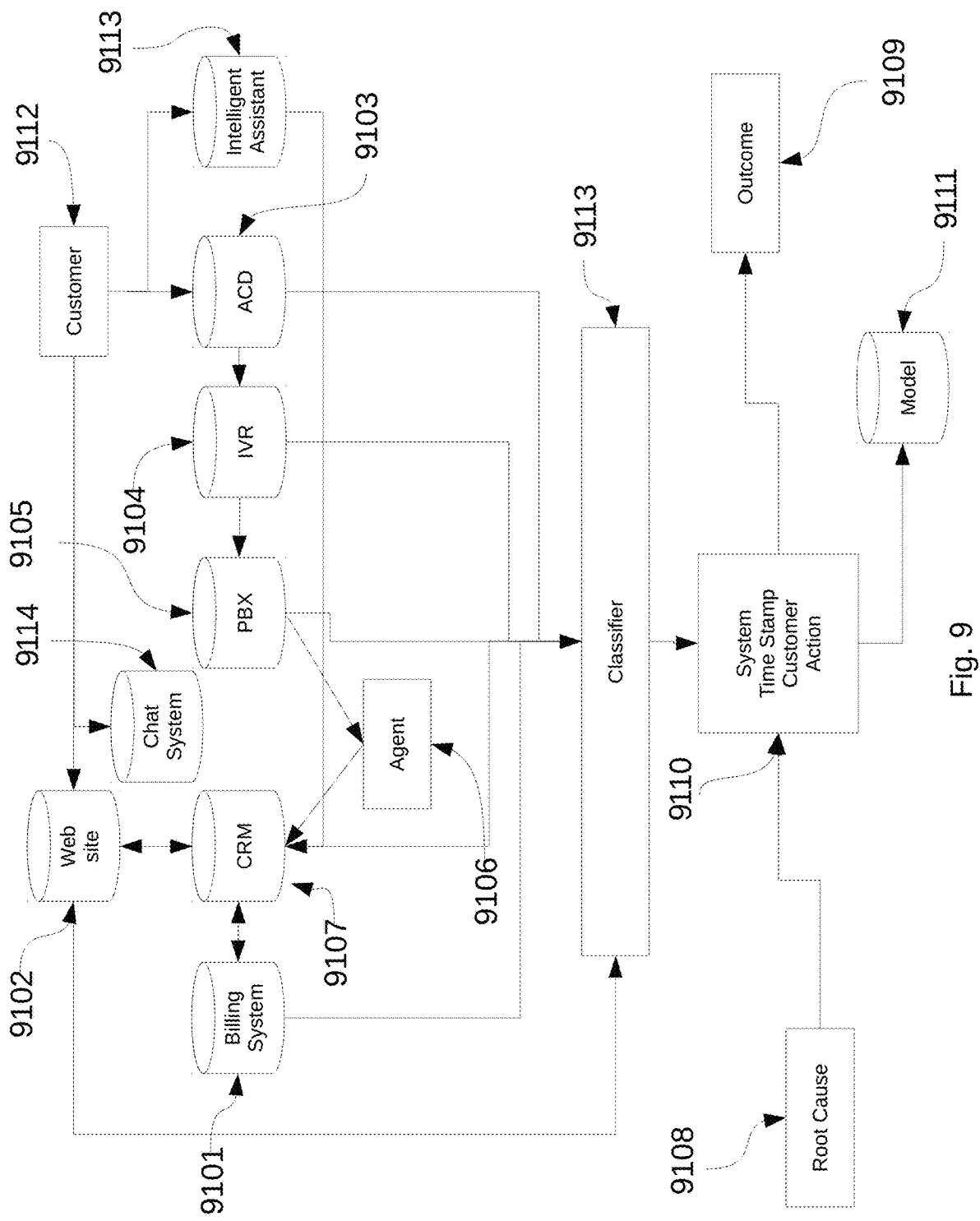
FIG. 9 illustrates an exemplary arrangement, according to the invention disclosed in the related and incorporated U.S. patent application Ser. No. 16/210,081, of computing components and elements to leverage disparate systems and data sources.

Referring now to FIG. 9, illustrates how an improved data processing system according to the '081 related and incorporated patent application leverages disparate systems that record customer events to identify customer behavior linkages between root causes and customer outcomes into predictive models. The exemplary arrangement of computing components, machine-performed logical processes, and communications networks in FIG. 9 include, but are not limited to, data processing systems that are often present within an organization, such as a billing system 9101 that stores information related to a customer's bill, a web site 9102 that customers 9112 can access to view information about a product or service, access their bill, and conduct customer self-service tasks, and a Customer Relationship Management (CRM) system 9107 that stores information regarding customer activity and interactions with the organization.

For customer interactions that involve speaking with an agent 9106, calls usually terminate into an Automatic Call Distributor (ACD) 9103 where the customer may be routed to an Interactive Voice Response (IVR) 9104 system so that the customer has the option for self-service, or directly to an available agent. Customers may also interact with the organization via an Intelligent Assistant 9113 such as Amazon Alexa™, Google Home™, or Facebook Messenger™ for self-service which accesses the customer's information in the CRM system 9107. In cases where the customer needs to speak directly to an agent, the call is routed to an agent whose phone is connected to a Private Branch eXchange (PBX) 9105 in a call center, who is able to facilitate the desired customer and/or business outcome to address the root cause.

Some notable key elements of the improved data processing system, according to the '081 related and incorporated patent application, include a classifier 9113, which provides raw data for a model 9111 to identify and correlate common customer paths to outcomes 9109 related to a root cause 9108. Given that the customer behaviors to be analyzed are stored across disparate data processing systems mentioned previously, a beneficial improvement to the computing technology provided by some embodiments of the '081 related invention is its ability to automatically identify and correlate customer behaviors from these disparate systems. This is done, in at least one embodiment, by automatically identifying similarities in the data sets and then inferring relationships. The primary elements of correlation may include a unique customer identifier, one or more session identifiers, and one or more event or record date/time stamps. These elements, along with the content of the data element, may allow the embodiment to create a digital representation or model of customer behavior paths over time.

Customer paths are aggregated, by the improved computing system, by one or more criteria including a unique customer identifier, classes of customers based on attributes such as customer type, lifetime value, total spend, outcomes, events, and root causes. The most common statistically significant paths are automatically compared, by the improved computing system, against one or more domain models 9111 which may be stored by the data processing system. The domain models are able to create observations and their associated recommendations to improve customer and business outcomes based on previous outcomes related to the same or similar customer paths. These domain models may be supplied by domain experts or created by the organization wishing to use the '081 related invention to improve customer outcomes. The models are automatically improved based on actual outcomes against the predicted outcomes generated by the system.

Figure 10:
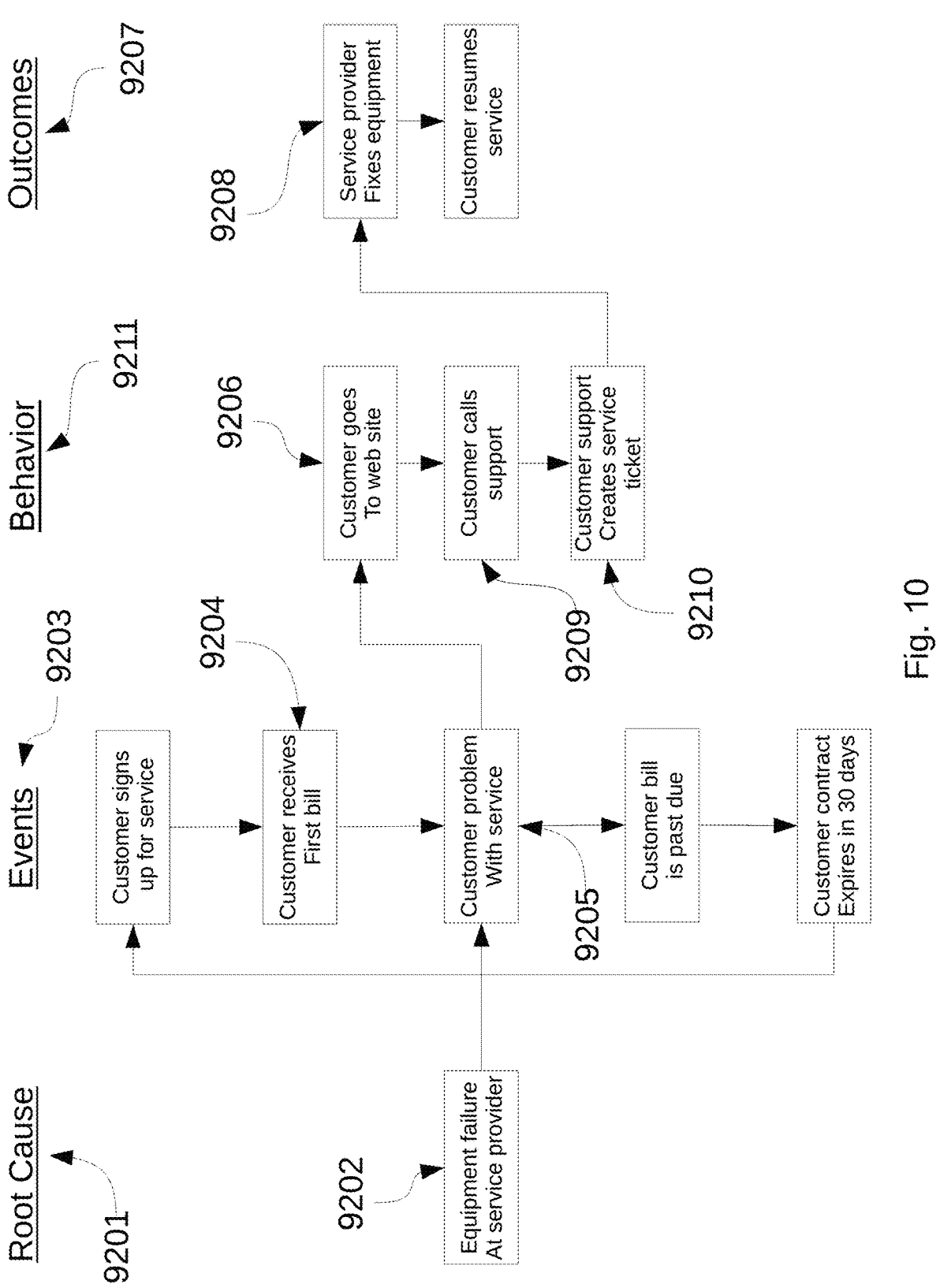
FIG. 10 shows, for reference, a hypothetical flow of user experiences interacting with the technology which represents a business entity's enterprise.

FIG. 10 shows a sample method or process, by the improved computing system, according to the, as disclosed in the '081 related and incorporated patent application, of how a root cause drives one or more events that result in customer behaviors that cause a customer outcome. This example process includes some or all of an identification of a root cause 9201, a computer record of a series of related events 9203, a plurality of examples of related customer or provider behaviors 9211, and their associated outcomes 9207. For example, given a root cause 9201 such as an equipment failure 9202 that causes an interruption of a customer's service 9205 which leads the customer to visit the service provider's web site 9206, then event records indicate that those customers with that problem subsequently call customer support 9209 who, most often, creates a service ticket 9210 in the service provider's system, which most often results in the service provider repairing the customer's equipment 9208.

Figure 11:
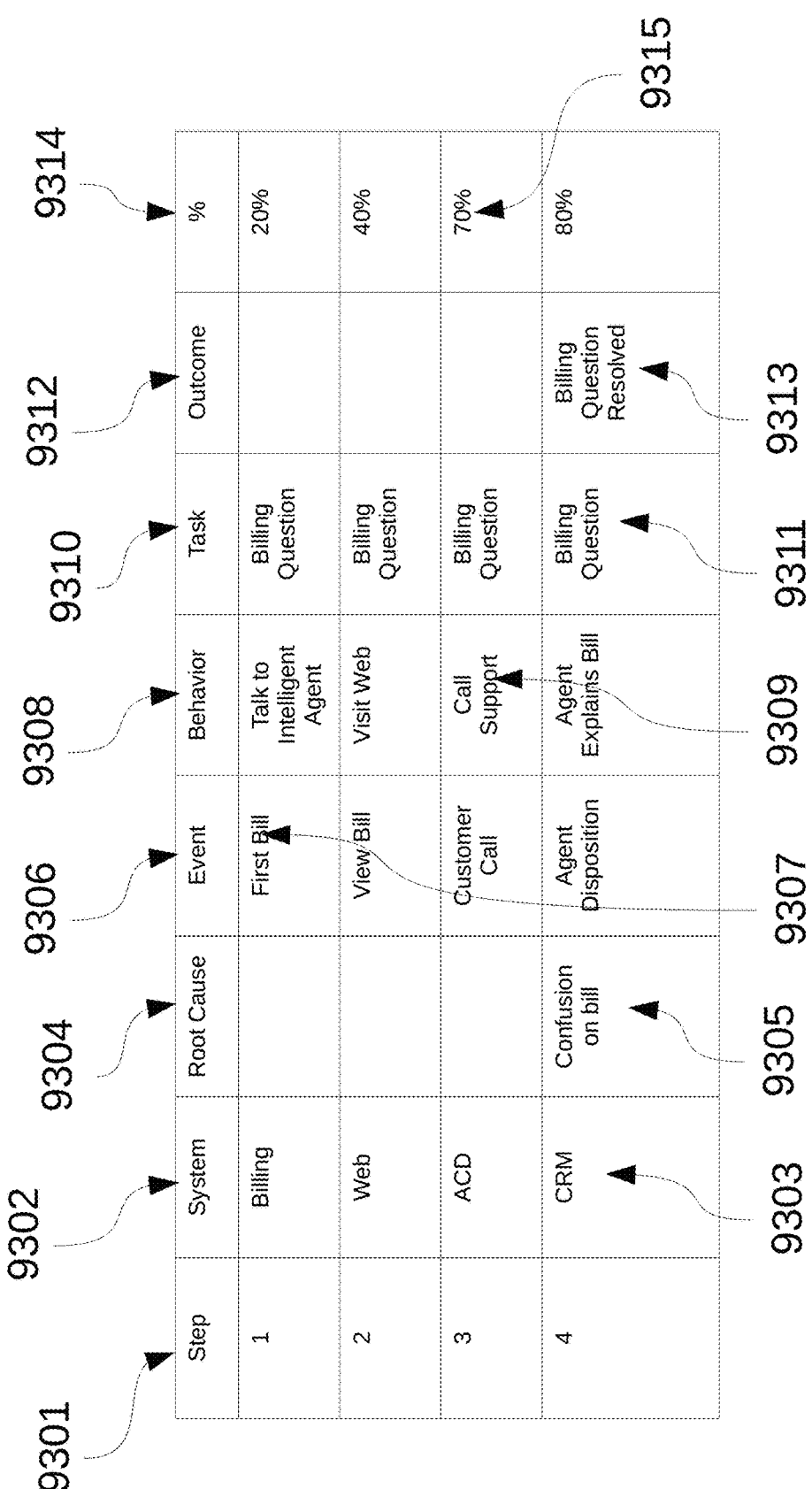
FIG. 11 presents an exemplary data structure embodiment for a classifier, according to the invention disclosed in the related and incorporated U.S. patent application Ser. No. 16/210,081, to collect and correlate disparate system events.

FIG. 11 provides details of an exemplary embodiment according to the '081 related invention for how the classifier of FIG. 9 collects, structures and correlates disparate system event records for customers over time and documents the customer behaviors and tasks associated with those events and behaviors and eventually correlates them to a customer outcome and root cause and measures the percentage of customers that were affected by that specific set of steps. This exemplary embodiment collects and analyzes customer behaviors 9308 from disparate systems 9302 such as CRM 9303 across multiple steps 9301 that may occur over the course of time to achieve a given outcome 9312 such as resolving a billing question 9313. If the digital model accurately predicts the root cause 9304 as described in the FIG. 1, such as a customer's confusion of their first bill 9305, in addition to tying the steps to the related task 9310 performed by the customer or the agent which occurs when the customer calls the organization 9309, such as answering the billing question 9311, then the automated system will be able to accurately predict what the dominant customer paths will be and their statistical significance 9314 given an event 9304 such as a customer receiving their first bill 9307. In this specific example, the automated and improved data processing system would be able to make the observation that a significant percentage, such as 80%, of customers had their billing question resolved 9315. Based on the system generated observation, an associated recommendation and associated estimated benefits would be made, which are further detailed in FIG. 13.

Figure 12:
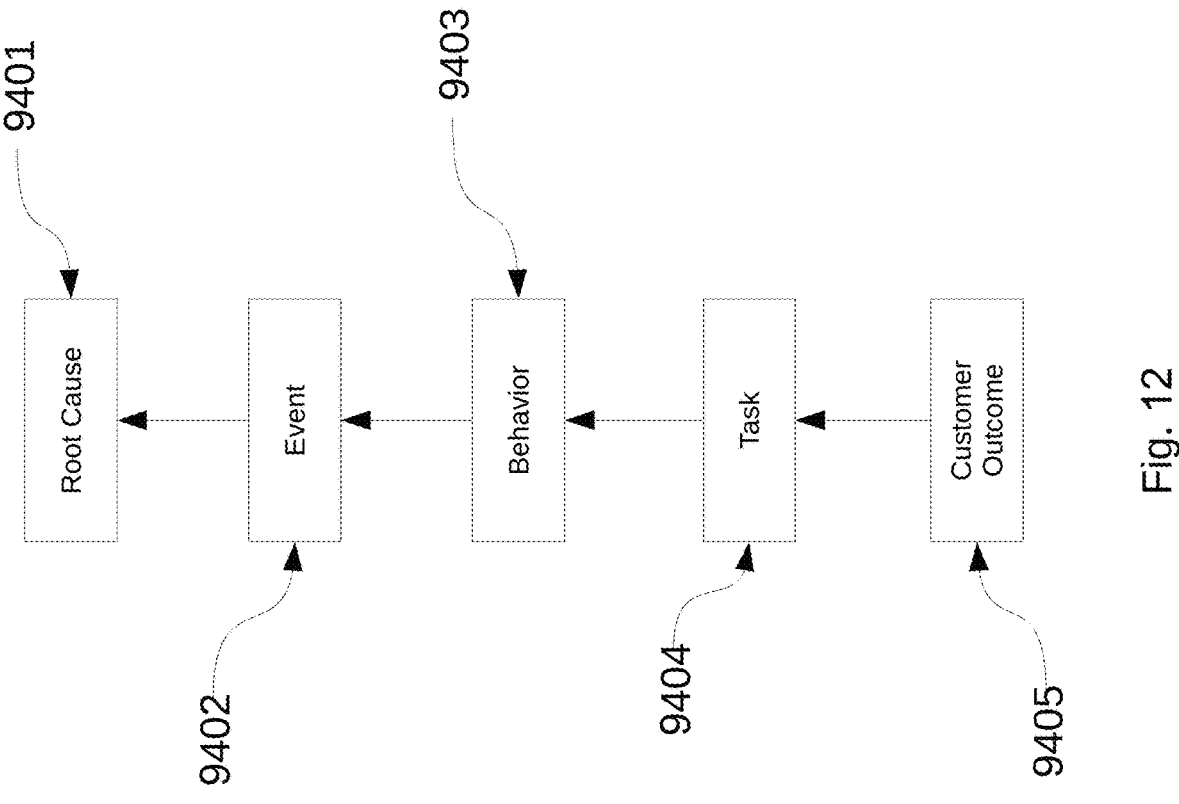
FIG. 12 illustrates an exemplary method, according to the invention disclosed in the related and incorporated U.S. patent application Ser. No. 16/210,081, for dominant path analysis.

FIG. 12 illustrates an exemplary embodiment according to the '081 related invention of a dominant path analysis process, which starts with a given customer outcome and analyzes customer interactions to identify the most common customer paths that occur to achieve a given outcome given an event and root cause. FIG. 12 further illustrates a path analysis process which at least one embodiment of the '081 related invention automatically performs. It begins with a given customer or business outcome 9405 and analyzes the data from the systems previously mentioned in FIG. 9 to identify all tasks 9404 that were performed by the agent, the Intelligent Agent, or the IVR on behalf of the customer to achieve the outcome. Each step taken to perform the task and the associated customer behaviors 9403, examples of which are contained in FIG. 10 and FIG. 11, are further identified and counted such that a tree containing the most statistically significant customer behaviors can be accurately traced to the given outcome. The improved data processing system then attempts to identify the event(s) 9402 and associated root cause(s) 9401 through direct correlations or probabilistic deduction based on previous instances of the same or similar event 9402 and the associated root cause 9401 analysis.

Figure 13:
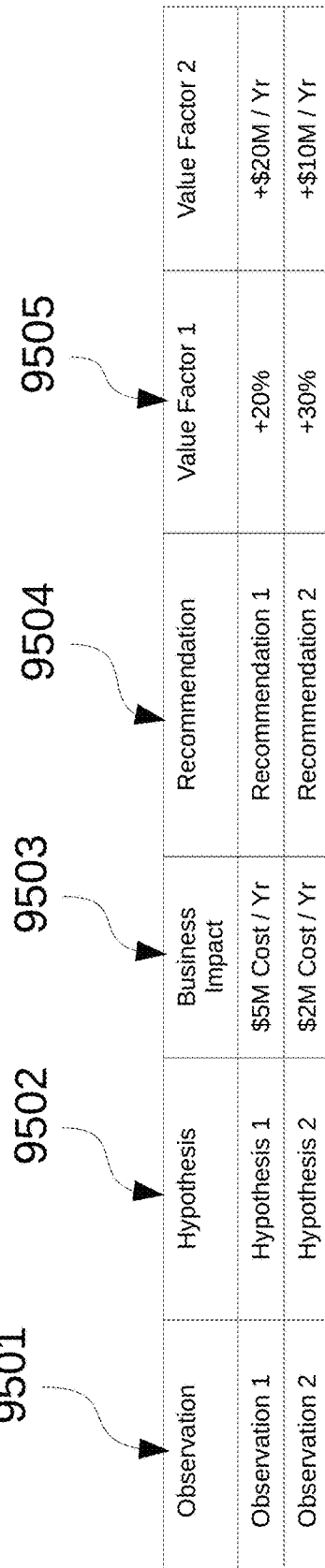
FIG. 13 sets forth an exemplary results report, according to the invention disclosed in the related and incorporated U.S. patent application Ser. No. 16/210,081, including observations, hypothesis, recommendations, and their estimated impacts resulting from exemplary methods of analysis relative to the examples shown in FIGS. 11 and 12.

FIG. 13 shows an exemplary embodiment of the results of at least one embodiment of the '081 related invention which are communicated to a user or another computer process, including the improved data processing system's observations, hypothesis, recommendations, and their estimated impacts resulting from the analysis in FIG. 11 and FIG. 12. This sample output of the recommendation 9504 and benefits model 9505 that matches the hypothesis 9502 are based on the observations 9501 made by the system based on the pattern analysis depicted in FIG. 11 and FIG. 4 as described previously. The associated business impact 9503 of the hypothesis is based upon the statistical significance of the observation as contained in FIG. 11. The output contained in FIG. 13 is comprised of data based upon domain experts that input sample outputs for a given domain based on their experience and the expected performance of the recommendations.

Training of Chatbots from a Corpus of Human-to-Human Chats. Having established a baseline functionality and terminology in the foregoing paragraphs, we now turn our attention to the disclosure of inventive processes and systems of a related for training a AI-based chatbot using a corpus of text-recorded human-to-human chats or conversations. For reference and for illustration of at least one example embodiment according to the present and related invention, the disclosure and drawings from the related invention are included herewith.

Figure 14:
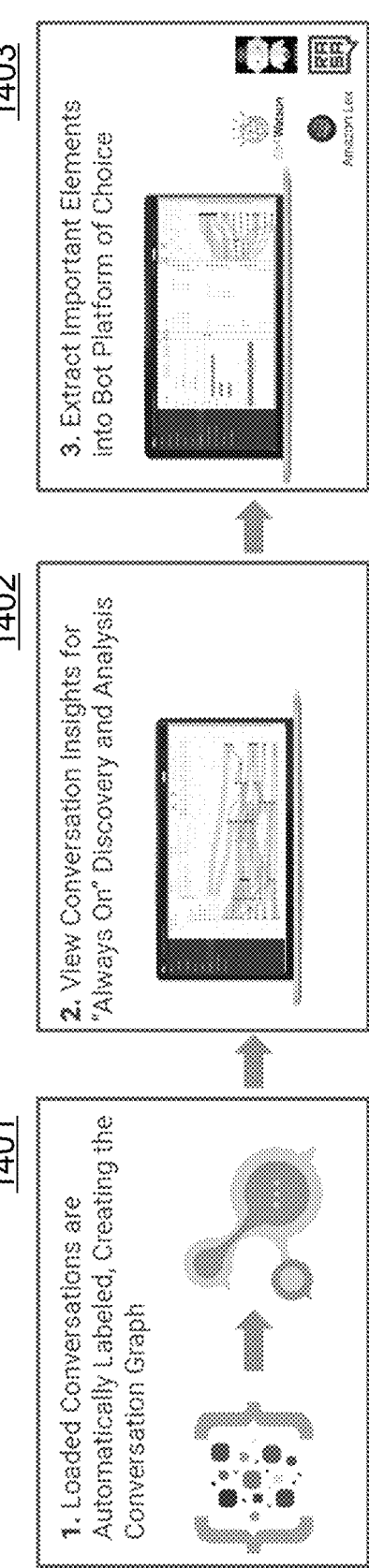
FIG. 14 illustrates a high-level process according to a related invention.

FIG. 14 illustrates a high-level process 1400 according to a related invention in which:

a. 1401 conversations are loaded from a corpus of real conversations, automatically labeled using a process such as that described in the foregoing paragraphs (or a suitable alternative), and a conversation graph is automatically created using a process such as that described in the foregoing paragraphs (or a suitable alternative);

b. 1402 a display of conversation paths which meet a user-selectable minimum path dominance is produced and shown to one or more human supervisors, such as a Sankey-type of display, using a process such as that described in the foregoing paragraphs (or a suitable alternative), to enable insight discovery by the human supervisor user; and c. 1403 under user command and selection, specific elements from the displayed conversation representation are extracted and exported to one or more third-party chatbot platforms such as, but not limited to, the IBM Watson™, Amazon Lex™, and/or Rasa open-source natural language processing chatbot platform, to accomplish the initial training of the AI model for the chatbot platform.

Figure 15:
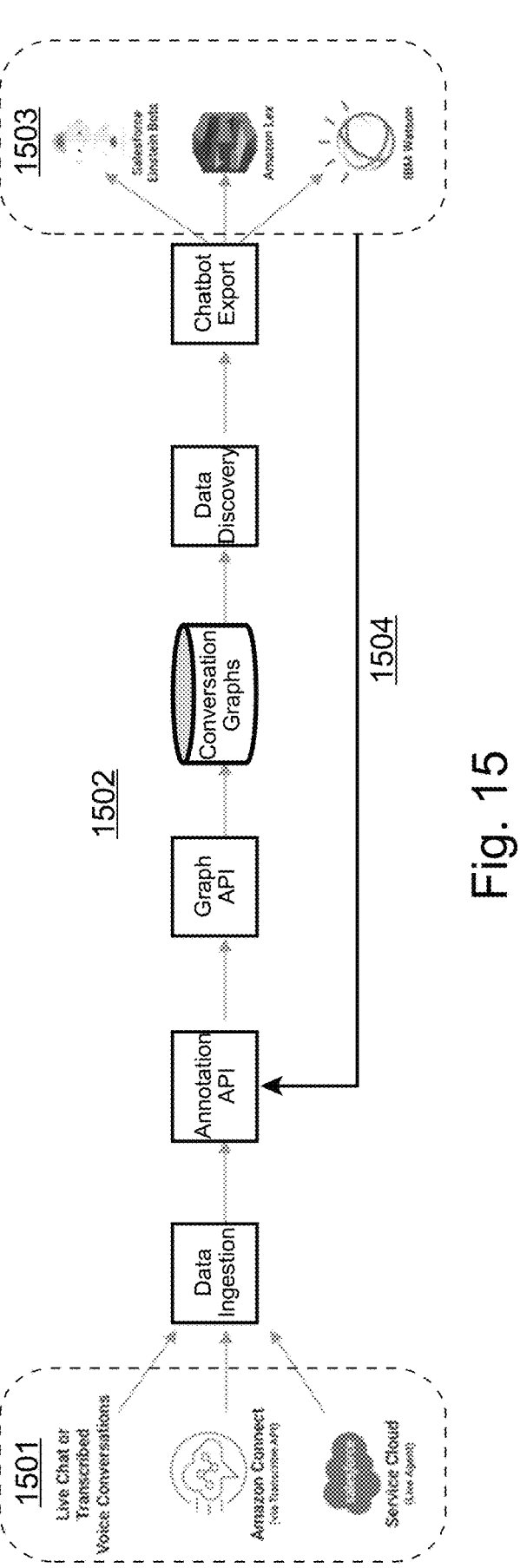
FIG. 15 illustrates an example production pipeline according to a related invention.

Turning to FIG. 15, more details of processes and systems according to a related invention are illustrated for one example embodiment 1500 of a production pipeline for the conservation data flow. Text-based conversation data 1501, such as, but not limited to, transcribed voice conversations, text-recorded text chats, or other sources of text-based conversation data, is received and ingested into the production pipeline 1502. The conversations are annotated and graphs are generated, using a process such as that described in the foregoing paragraphs (or a suitable alternative), and the graphs are collected into one or more databases. Data discovery is performed in order to train the initial AI models, which are then exported into one or more chatbot platform formats 1503. Optimization 1504 is performed using supplemental conversation data collected during use of the AI-based chatbot, wherein the supplemental conversation data is received into the production pipeline 1502 through ingestion or directly into the annotation (labeling) stage.

Figure 16A:
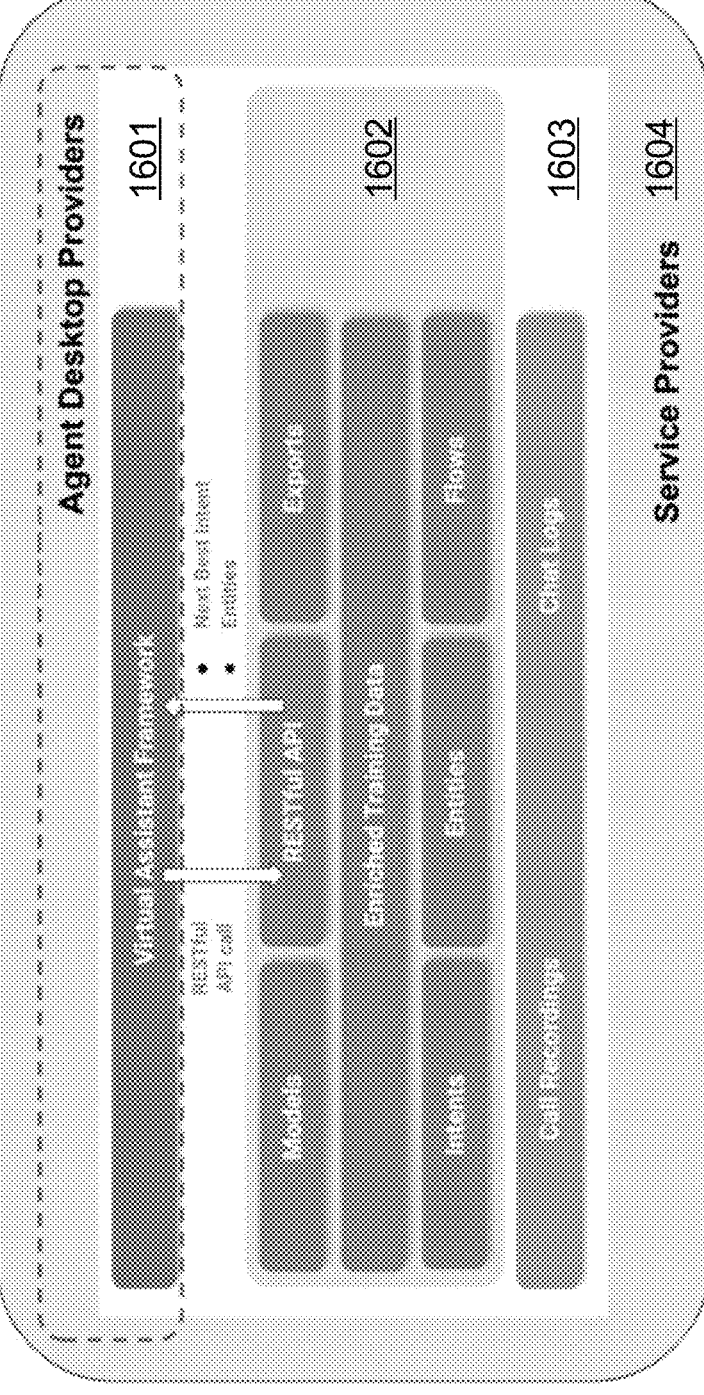

Referring now to FIG. 16A, at least one possible arrangement 1600 of systems and components is illustrated for at least one example embodiment in which a cognition engine 1602 utilizes one or more computer-performed processes and computer systems according to a related invention interfaces to one or more virtual assistant frameworks and agent desktop providers 1601, such as, but not limited to, Salesforce Einstein™, IBM Watson™, Google Dialog Flow™, Kore.ai, Salesforce Service Cloud™, Amazon Connect™ and Genesys™, via RESTful API calls and responses including a projected next-best intent and one or more entities. Data providers, such as, but not limited to, Nice™ and [Verint], may provide call recordings and/or chat logs 1603 to be ingested into the corpus for annotation and further processing as described in the paragraphs herein. Service providers 1604, such as, but not limited to, Accenture, Verizon, and Teleperformance may integrate these plurality of platforms and services. FIG. 16B illustrates a similar arrangement 1600' with additional detail for possible architectural components for the knowledge graphing 1605 and the conversational model server 1606. As shown in this example embodiment, the training pattern for output to an AI-based automated conversation agent may include, but are not limited to, some or all of sample prompts, entities, flows, intents, utterances, outcomes, speech acts, turn groupings, topics, phases, sentiment, clarifying questions or statements, conversation summaries, promises, next best turn, next best action, agent activities, business processes, and events.

As such, in at least one embodiment according to a related invention, text-based conversation data representing a plurality of conversations is ingested into a production pipeline for building a set of coefficients to seed a machine-learning process for one or more AI-based chatbots by annotating the text-based conversation data according to one or more criteria selected from intents, topics, turns, and outcomes. A dominant path modeler, such as, but not limited to, the dominant path modeler disclosed in FIG. 4, determines a plurality of dominant path weights for conversation paths between nodes of turns. A weighted conversation modeler then, using the dominant path weights, creates one or more weighted conversation models, such as, but not limited to, the weighted conversation model illustrated in FIG. 6, using the processes such as, but not limited to, those disclosed in the foregoing paragraphs and in the related and incorporated patent applications. For example, presuming as input a dominant path model data structure in which each dominant path weight (402, 404, 406, and 408) between steps in the paths represent the sums $W_1$-$\underline{W}_N$ of traversals between steps in the dominant path for each conversation represented in the ingested text-based conversation data, a weighted conversation model is created from each path segment $P_1$-$P_N$ between turns $T_1$-$T_N$ from each dominant path model and the associated weights $W_1$-$W_N$ by converting, such as by normalizing, each dominant path weight in the conversation model 600 such that the percentage of conversation traversals are represented as a percentage of the total traversals from the plurality of processed conversations. The weighted conversation model 600 now contains the normalized likelihoods that future conversations having similar or matching combinations and sub-combinations of intents, topics and outcomes will traverse each available conversation path. Whereas these normalized likelihoods are predictive of future behaviors, they can then be used as seed values for machine-learning coefficients in an AI-based process, such as an AI-based chatbot. Specific available chatbot platforms each require particular machine-learning seed value input data structures, which can be readily generated by a chatbot exporter as shown in FIG. 15.

Further, using text-based conversation records accumulated during subsequent user interactions with the chatbot, such as changes in dominant paths among previously-known intents, topics and outcomes, as well as additions of new intents, topics and outcomes, the machine-learning models and their operating coefficients may be periodically or continuously updated by ingesting the additional text-based conversation data into the production pipeline 1500, performing the forgoing processes on the augmented or supplemented corpus of conversation data, and exporting new (or revised) machine-learning coefficients to one or more AI-based chatbot platforms 1503.

As stated in the foregoing paragraphs, the generated training data can be equally well be exported to and imported by AI-based automated conversational agent system other than chatbots, such as, but not limited to, interactive voice response (IVR) systems, voicebot, prompts, entities, slots and flows. Those ordinarily skilled in the art will recognize that the invention is not interfacing to chatbots, that other embodiments can equally well be used to train other AI-based automated conversation agent systems.

Interactive Conversational Corpus Exploration User Interface. As previously discussed with particular regard to the example high-level process shown in FIG. 14, after conversations have been loaded from a corpus of real conversations, automatically labeled using a process such as that described in the foregoing paragraphs (or a suitable alternative), and a conversation graph has been automatically created using a process such as that described in the foregoing paragraphs (or a suitable alternative), the present inventors have developed a unique user interface (UI) 1402 and method of interacting with a user via the UI which a displays conversation paths that meet user-selectable minimum path dominance to one or more human supervisors via a computer human interface device, such as displaying a Sankey-type of graph, to enable insight discovery by the human supervisor user of which conversational paths to model and represent in training data for an AI-based automated agent system. Such a user interface, while particularly useful to the systems and methods of the related inventions disclosed herein, is not limited to such utility, and can well be used to explore corpora of digitally recorded two-interlocutor conversations separate and apart from AI-based automated agent systems, as those skilled in the relevant arts will readily recognize. Similarly, embodiments of a UI according to the related invention as disclosed in the Ser. No. 16/786,923 patent application. may also be realized with respect to and interoperability with other automated agent systems, not just those of the example embodiments disclosed herein.

In general, according to the related invention as disclosed in the Ser. No. 16/786,923 patent application, at least embodiment includes improving a Dashboard GUI generator 1607, as referenced in FIG. 16B, to perform certain computer functions to present a flow-oriented graphical depiction through which, under user command and selection, specific elements from the displayed conversation representation are explored in user-selectable levels of detail. This exploration utility provided by the improved UI enables a user of some embodiments to then control which conversational paths contained within the corpus, but not all paths, will be subsequently extracted and exported to one or more AI-based automated agent systems and platforms, as previously discussed.

Figure 17:
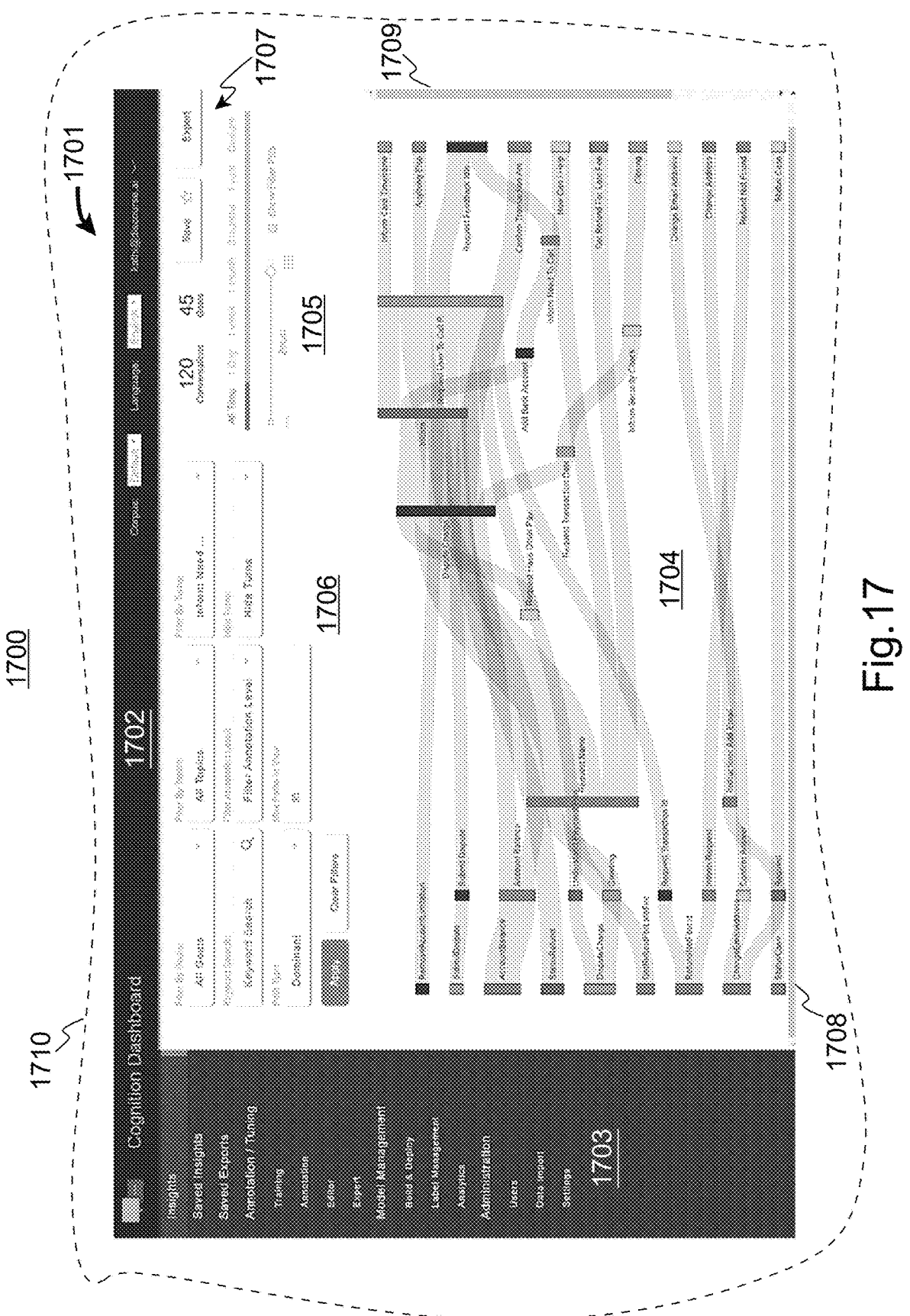
FIG. 17 depicts an example User Interface (UI) which is automatically prepared, rendered and displayed by a computer system using one or more processes according to the related invention as disclosed in the Ser. No. 16/786,923 patent application, including an interactive flow-diagram.

Referring now to FIG. 17, an example UI 1701 is shown 1700 as prepared, rendered and displayed, such as by overlaying onto the existing UI, by the system on a portion 1710 of a computer human interface device, such as on a computer screen, printout, transmitted image, projected image, etc., according to the related invention as disclosed in the Ser. No. 16/786,923 patent application. This particular example embodiment 1701 includes a banner area 1702 across the top, in which a digital corpus, a natural language, and a set of user preference can be selected by a user. On the left margin 1703 of this particular example embodiment one or more top-level actions can be selected by the user, such as by moving a pointer using a mouse, trackball, touchscreen, etc., and selecting an action, such as by tapping, clicking, or touching. In a portion 1704 of this particular example embodiment is shown a flow-oriented graph, such as an interactive Sankey-style diagram, which has been automatically been prepared, rendered and displayed, such as by overlaying onto the existing UI, by the system according to this example embodiment of the invention under initial filter settings and initial constraints.

In another portion 1705 of this particular example embodiment, the user is provided by the system's preparation, rendering and displaying, such as by overlaying onto the existing UI, one or more indicators of the initial (default) constraints and, in another portion 1706, the user is provided one or more indicators of the initial (default) filter settings which were used in the creation of the currently-displayed flow-graph 1704. These filter criteria 1705, 1706 are preferably interactive so that the user can selectably change them, thereby triggering updates to the flow-graph 1704, to explore underlying lower-level details and to gain higher-level insights of the data within the selected corpus. Whereas a typical corpus containing hundreds or thousands of conversations may result in a considerably large and detailed flow-graph, panning 1708 and scrolling 1709 controls may also be provided on the UI.

Figure 18:
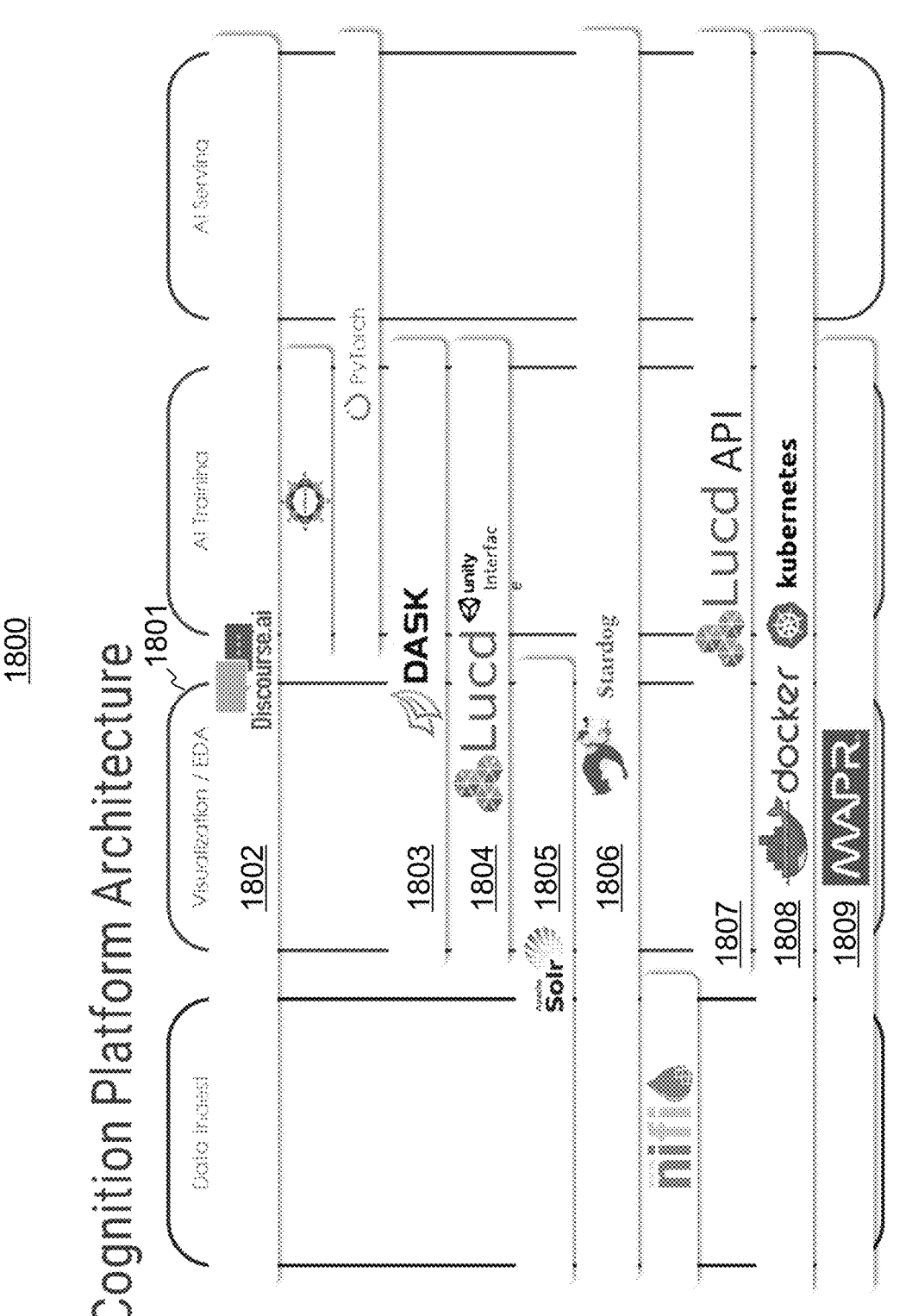
FIG. 18 sets forth an example architecture of a cognition platform, including in particular a Visualization and Exploratory Data Analysis (EDA) subsystem according to the related invention as disclosed in the Ser. No. 16/786,923 patent application.

Referring now to FIG. 18, one example cognition platform architecture 1800 for realizing such an embodiment

1802 according to the related invention as disclosed in the Ser. No. 16/786,923 patent application includes a Visualization and Exploratory Data Analysis (EDA) 1801 component which access and uses available functions through Application Programming Interfaces (APIs), libraries, remote function calls, and/or software-as-a-service from:

a. a flexible analytics library 1803 for scalable parallel computing, such as DASK in Python, available from NumFOCUS™;

b. an interactive AI modeling interface for an enterprise AI platform 1804, such as the Lucd Unity™ Interface for the Lucd™ Enterprise AI Platform from Deep Insight Solutions, Inc.;

c. an enterprise-searching 1805, such as the open-source Apache SoIr™ search platform from the Apache Lucene project;

d. data unification 1806, such as the Stardog™ data unification platform using knowledge graph from Stardog Union Inc.;

e. an API-accessible AI-based services platform 1807, such as the API to the previously-mentioned Lucd™ AI platform;

f. services to build, distribute and run containers 1808, such as Docker Swarm™ and Kubernetes™; and g. services for optimizing storage, management, processing and analysis of data for AI and analytics applications 1809, especially for distributed data in the cloud, such as those available from MapR™.

In other embodiments, other available services, APIs, platforms, etc., may be accessed, co-opted, engaged, integrated, or otherwise employed to achieve the functionality of the related invention disclosed in the Ser. No. 16/786,923 patent application.

Figure 19:
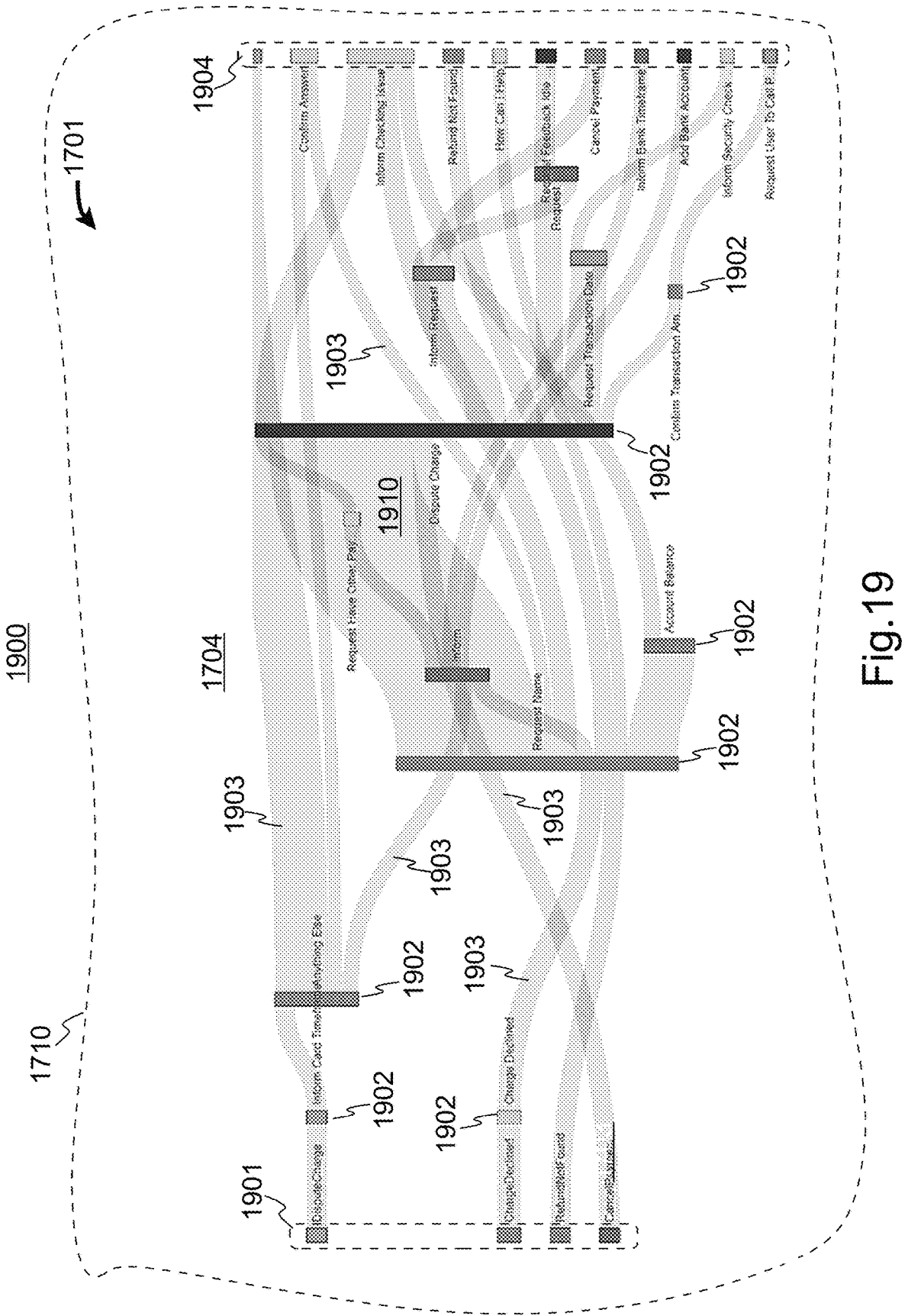
FIG. 19 provides a depiction in greater detail of the example flow-graph as illustrated in FIG. 17 according to the related invention as disclosed in the Ser. No. 16/786,923 patent application.

Further, according to this example embodiment, the system prepares, renders and displays, such as by overlaying onto the existing UI, a Conversation Insights Flow-Graph 1704, an example of which is shown 1900 in greater detail in FIG. 19, which is, preferably, a Sankey-type flow-graph visualization of the aggregate of conversations which meet a specified set of filters criteria, and their associated flows, according to the related invention as disclosed in the Ser. No. 16/786,923 patent application. The user-interactive flow-graph is loosely showing information from the source (the conversation Goals, in this example case) on the left of the flow-graph, to the end of the conversation, on the right, as such:

Customer Goals are shown as the source of the flow (with conversation Goals depicted on the left 1901);

The width of each conversation pipe 1903 (depicted in this example as gray bands) flowing rightward from the conversation Goals on the left represent proportional volumes of conversations for each goal;

The vertical bars 1902 (depicted in this example as colored bars) to the right of the Goals represent the "Turns" in the represented and aggregated conversations, recalling from earlier paragraphs that Turns are a back-and-forth conversational transitions between two interlocutors;

The wider flows show the statistically and relatively more dominant paths in the conversations in the selected corpus, depending, preferably, on Zoom and Max Paths user display settings;

A user may interactively select (e.g., click, tap, touch, etc.) on a depicted Turn Purpose bar to see conversations containing these Turns; and A user may select (e.g., click, tap, touch, etc.), hold and drag the Turn Purpose bar to get a better view of the conversation flows.

Figure 20:
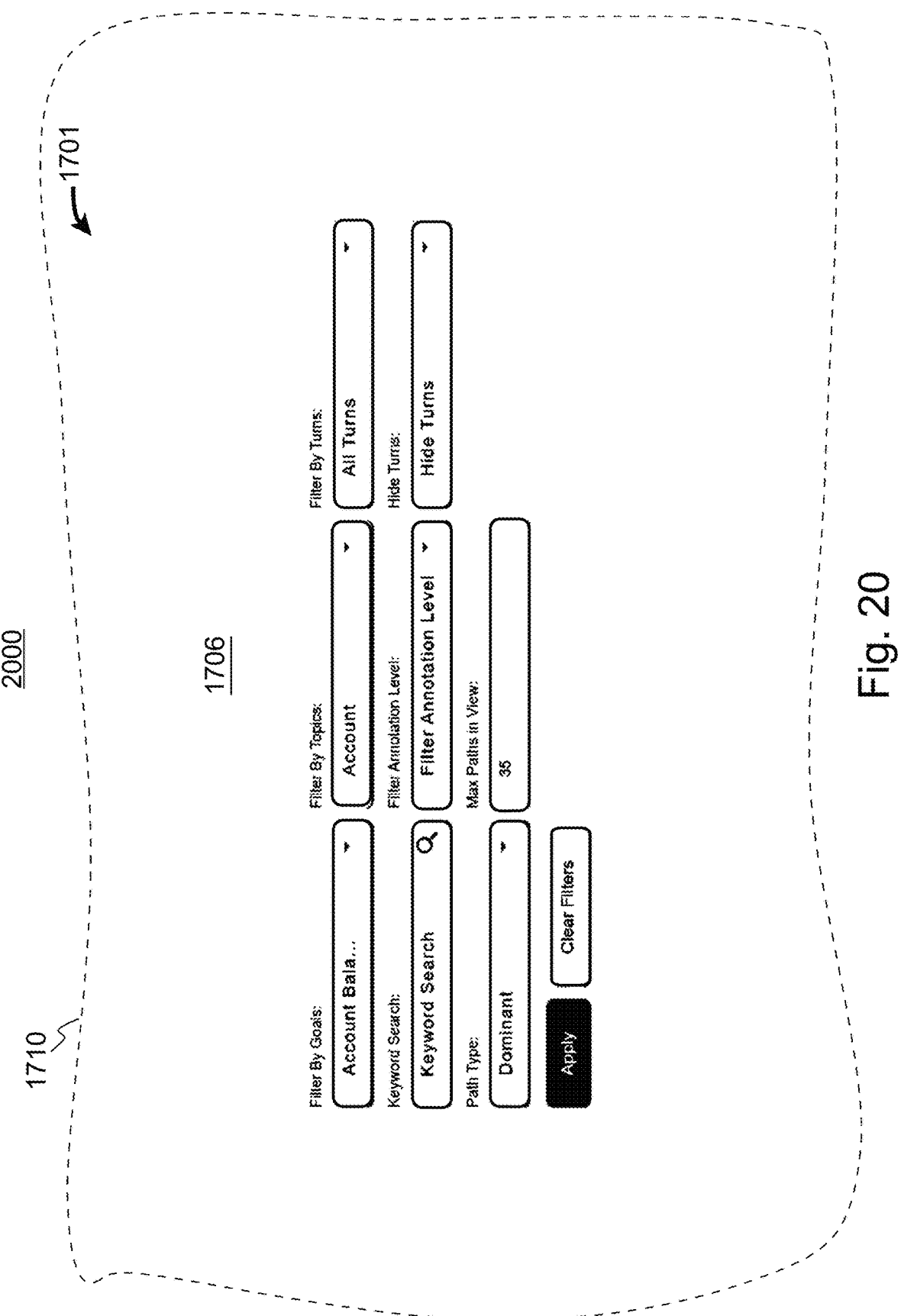
FIG. 20 depicts an example User Interface (UI) which is automatically prepared, rendered and displayed by a computer system using one or more processes according to the related invention as disclosed in the Ser. No. 16/786,923 patent application, including a set of user-adjustable filter criteria for causing the computer to revise and update the flow-graph of FIG. 17.

Some example features of at least one embodiment according to the related invention as disclosed in the Ser. No. 16/786,923 patent application, the system prepares, renders and displays, such as by overlaying onto the existing UI, a Conversations Insights Filters portion 1706 of the UI 1701 as shown 2000 in FIG. 20. For each of the "Filter By" features (Filter By Goals, Filter By Topics, Filter By Turns, Filter By Annotation Level), the user can move the cursor or pointer into the desired selection box, and optionally select (e.g., click, tap, touch, etc., or just hover over in some embodiments), and the system will produce on the UI a drop-down list. The user may make a selection (or selections), and select the "Apply" button to have the filter applied to the view. Responsive to the activation of the Apply button, the system re-runs the searching and filtering processes on the corpus, re-runs the flow-graph generating processes using the results of the searching and filtering processes, and updates the flow-graph depiction 1704 on the UI.

According to at least one example embodiment according to the related invention as disclosed in the Ser. No. 16/786, 923 patent application, user selections received from a drop-down dialog are considered by the system using a logical OR function. For example, conversations which are filtered for three Goals will include at least one or more of those goals. In other embodiments, this logical function may be more customizable, such as by providing the user more logical operators to use in the filtering, such as AND, Exclusive OR (XOR), and NOT. As the user makes selections across multiple "Filter By" options, the user is interactively requesting for the system to search, sort and filter the conversations in the corpus to update the flow-graph to show only Topics, Goals and flows which meet the revised "Filter By" criteria. Additional "Filter By", as shown in this example embodiment of the UI, may include:

Keyword Search: Search for conversations based on keyword or semantic search of the Graph;

Hide Turns: Exclude Turns in combination with any other filters, to provide a more focused view of the conversation flow;

Path Type: "Dominant", presents your highest frequency conversation sets based on the user's selected filters, and "Outlier" shows the "long tail"; and Max Paths in View: Can be modified to a higher/lower number of paths to be displayed in the diagram.

Figure 21:
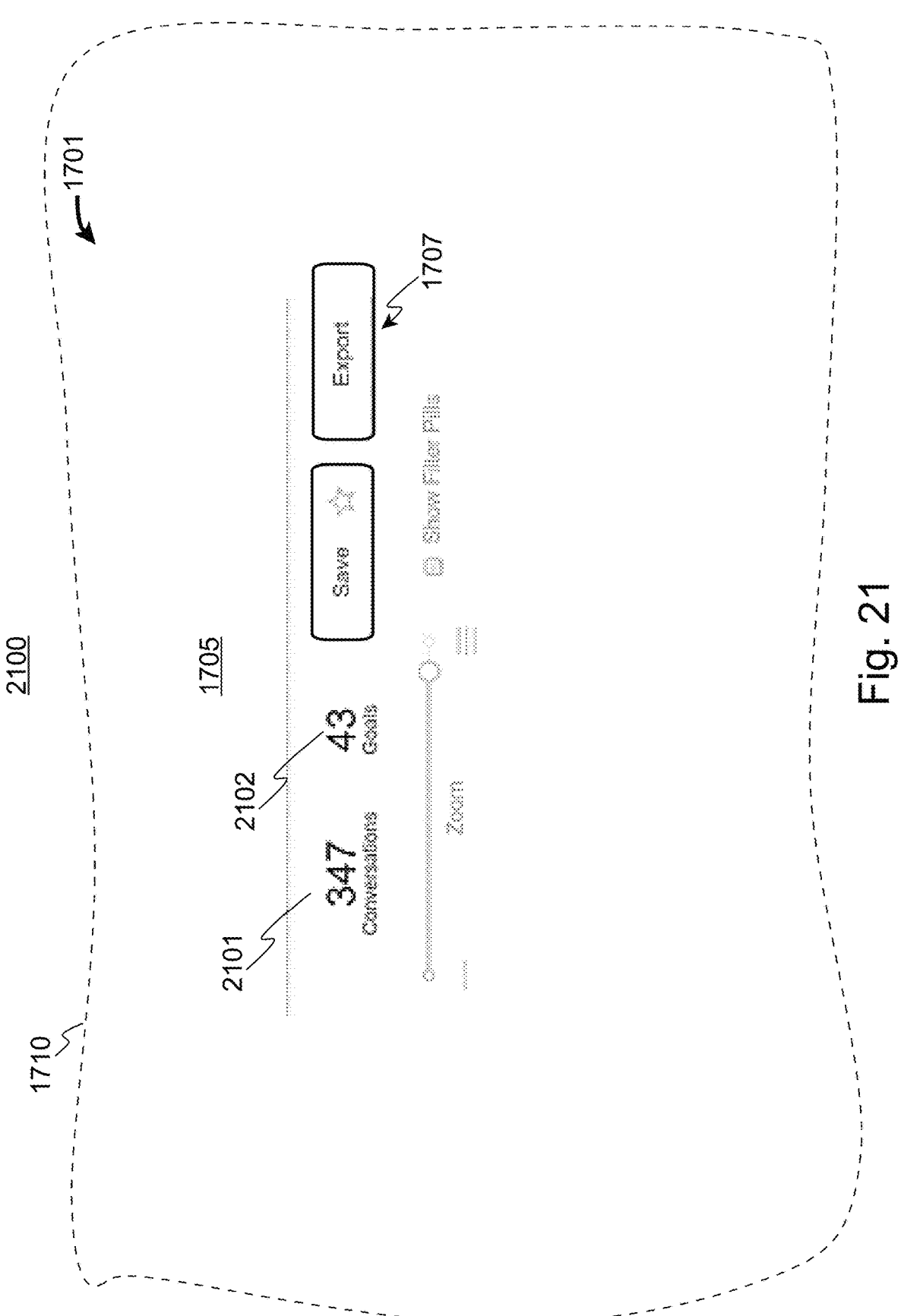
FIG. 21 depicts an example User Interface (UI) which is automatically prepared, rendered and displayed by a computer system using one or more processes according to the related invention as disclosed in the Ser. No. 16/786,923 patent application, including a set of user-adjustable constraints for causing the computer to revise and update the flow-graph of FIG. 17.
Figure 22:
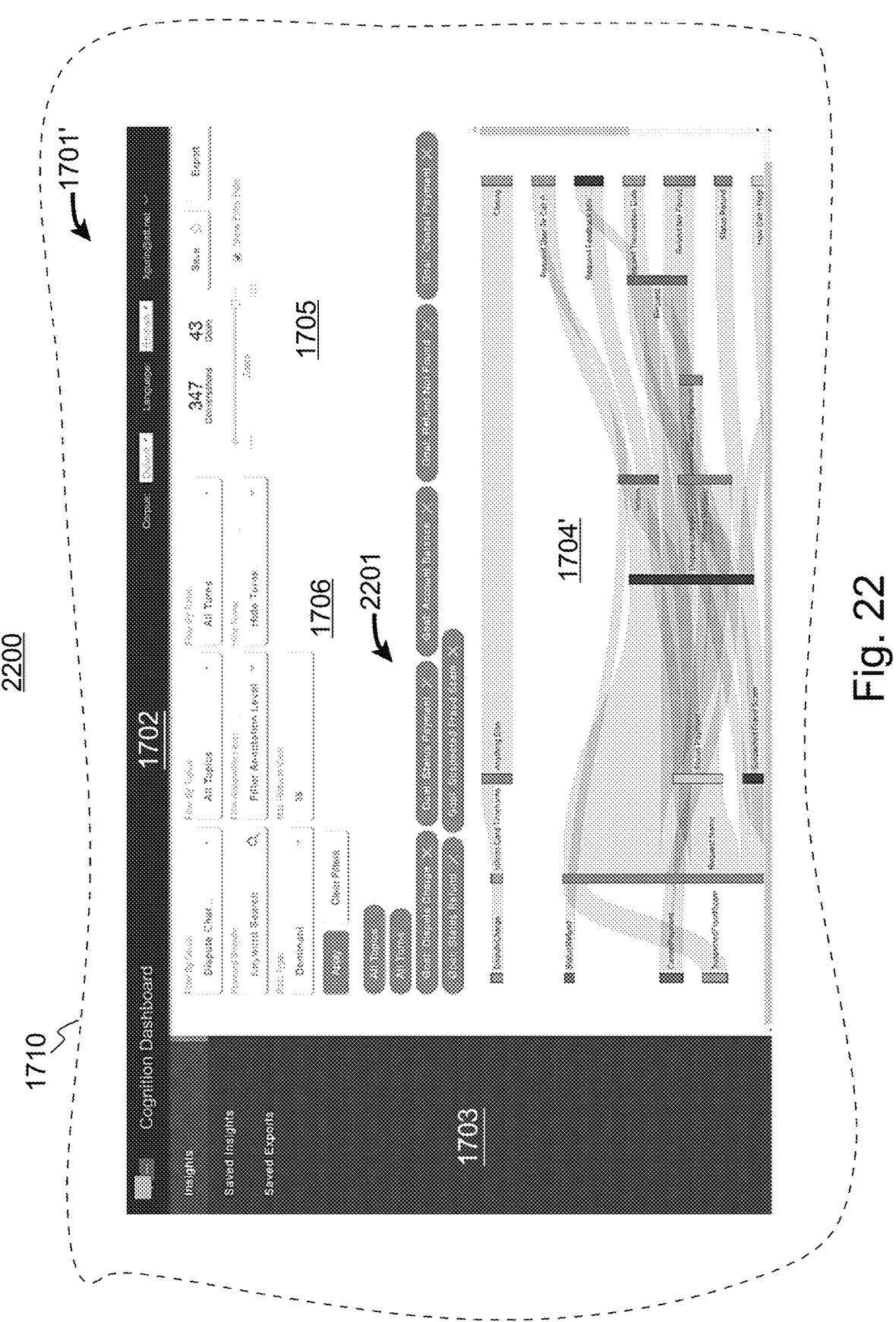
FIG. 22 depicts an example User Interface (UI) which has been automatically updated by a computer system using one or more processes according to the related invention as disclosed in the Ser. No. 16/786,923 patent application, from the depiction of FIG. 17 following user-adjustment of one or more of the filters and constraints.

Referring now to FIG. 21, the system according to the related invention as disclosed in the Ser. No. 16/786,923 patent application also, preferably, prepares, renders and displays, such as by overlaying onto the existing UI, an example constraints portion 1705 is shown 2100 for a UI, including an indication of the current number of conversations and Goal which meet the Filter By conditions and are represented in the currently-rendered flow-graph, a Zoom level control for scaling up or down the actual depiction of the flow-graph, an option, such as a button, to save the current filter criteria (preserves the filters set, creating a "Saved Insights" for future/shared view), an option to show "Filter Pills" (highlights the filter criteria for easy visibility) and an option to Export the filters set (preserves the filters set, creating a "Saved Export" (in format chosen) for future use). FIG. 22 provides a depiction of the updated UI 1701' with the revised flow-graph 1704', as re-generated by the system the applied example filter criteria changes of FIGS. 21 and 22, including the Filter Pills 2201 which indicate all of the currently filtered-on Goals, Turns, and Topics. As shown, each of these Filter Pills can be further selected by the user, responsive to which the system will update the filter results and the flow-graph accordingly.

Figure 23:
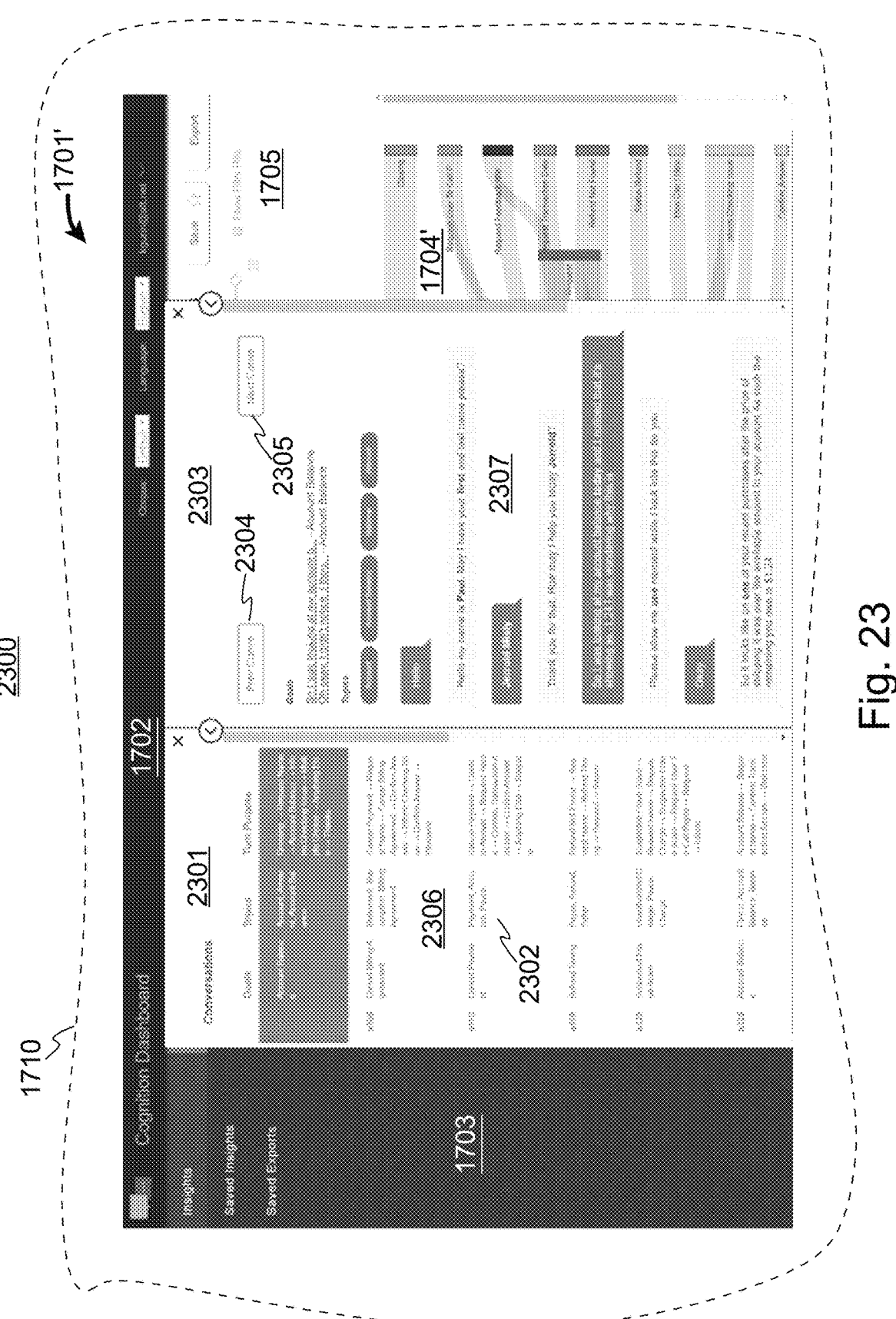
FIG. 23 depicts an example User Interface (UI) which is automatically prepared, rendered and displayed by a computer system using one or more processes according to the related invention as disclosed in the Ser. No. 16/786,923 patent application, including one or more drill-down dialogs such as the illustrated set of conversation detail drawers.
Figure 24:
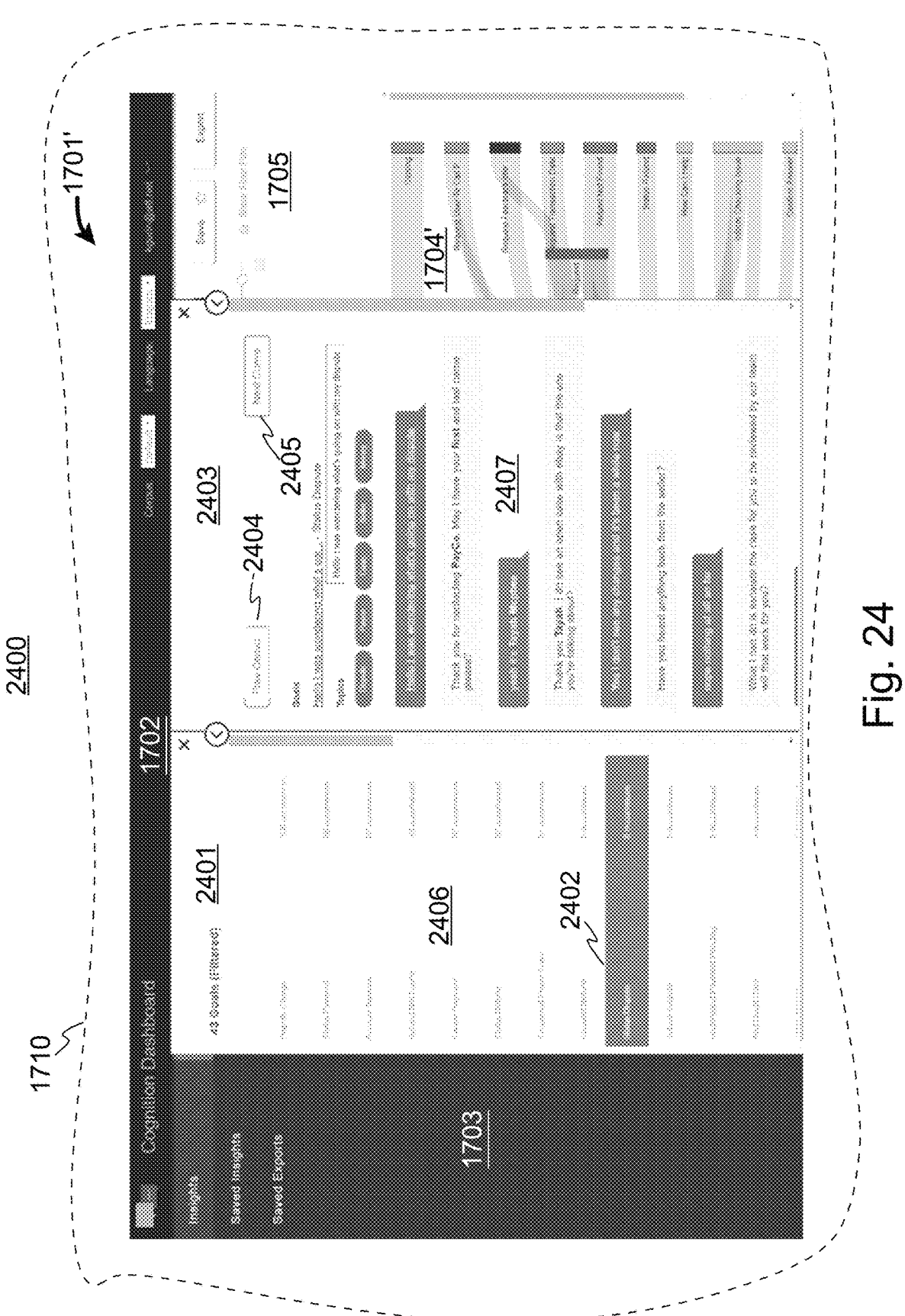
FIG. 24 depicts an example User Interface (UI) which is automatically prepared, rendered and displayed by a computer system using one or more processes according to the related invention as disclosed in the Ser. No. 16/786,923 patent application, including one or more drill-down dialogs such as the illustrated set of Goals detail drawers.

User Interface Drill-Down Functions. Further according to the related invention as disclosed in the Ser. No. 16/786, 923 patent application, some embodiments may provide advanced UI functions to allow exploring and drilling-down on details with in the broader corpus itself, and, preferably, within the selected subset of the corpus which meets the current filter criteria, as depicted in FIGS. 23 through 24. The present example embodiment provides Conversation Drawers.

In one manner of invoking this UI advanced function, the user selects (e.g., click, tap, touch, etc.) the Conversation Count 2101, as shown in FIG. 21, in the filter criteria portion 1705 of the UI. Responsive to receipt of this user selection, the system will prepare, render and display, such as by overlaying onto the existing UI, a Conversations Drawer 2301, as shown 2300 in FIG. 23, to a portion of the UI, revealing a list 2306 of the conversations that comprise the current flow-graph which is rendered on the UI.

From this view with the Conversations Drawer 2301 open, the system may receive a user selection (e.g., click, tap, touch, etc.) of any one Goal 2302, responsive to which, the system prepares, renders and displays, such as by overlaying onto the existing UI, an open Conversation Detail drawer 2303, which displays the interlocutor conversation turns 2307. In preferred embodiments, when the list of conversations 2306 in the Conversations Drawer 2301 or the details of the actual conversations 2307 with the present system zoom level precludes displaying the entirety of the contents of the open drawer(s), a scrolling control may be provided to the UI to allow the user to command the system to display additional contents above or below the contents presently shown. Further, according to a preferred embodiment, the UI is rendered with user-selectable controls to navigate in the Conversations Detail drawer 2303 to the next conversation 2305 and to the previous conversation 2304, responsive to selection of which will cause the system to prepare, render and display, such as by overlaying onto the existing UI, the details of the next or previous conversation accordingly.

In another manner of invoking this UI advanced drilldown function, the user selects (e.g., click, tap, touch, etc.) the Goals Count 2102, as shown in FIG. 21, in the filter criteria portion 1705 of the UI. Responsive to receipt of this user selection, the system will prepare, render and display, such as by overlaying onto the existing UI, a Goals Drawer 2401, as shown 2400 in FIG. 24, to a portion of the UI, revealing a summary 2406 of the Goals that comprise the current flow-graph which is rendered on the UI.

From this view with the Goals Drawer 2401 open, the system may receive a user selection (e.g., click, tap, touch, etc.) of any one Goal 2402, responsive to which, the system prepares, renders and displays, such as by overlaying onto the existing UI, an open Goal Detail drawer 2403, which displays the actual occurrences 2307 of conversations during which the customer stated this selected Goal as their goal (Note: there may be multiple goals).

As with the Conversations Drawer and Conversation Detail drawer, the UI may be provided with a scrolling control may be provided to the UI to allow the user to command the system to display additional contents above or below the contents presently shown, as well as provided with user-selectable controls to navigate to the next conversation 2405 and to the previous conversation 2404, responsive to selection of which will cause the system to prepare, render and display, such as by overlaying onto the existing UI, the details of the next or previous conversation accordingly.

Discovering Intents and Goals. In general, systems and methods implementing the improvements according to the related invention as set forth in the incorporated U.S. patent application Ser. No. 17/124,005 on a computing device analyze a digital corpus of unstructured interlocutor conversations to discover intents, goals, or both intents and goals of one or more parties to the electronic conversations by:

a. Applying, by the computer system, a dialog act classification model to identify the utterances that fall into specific classes, such as the client's goal, the agent's request for information and agent's providing of information. The utterances that fall in these classes are sent to the next clustering steps.

b. Gouping, by the computer system, the digitally-recorded conversations according to similarity into clusters.

c. Creating, by the computer system, a set of candidate intent names for each cluster based upon each intent utterance in each conversation in each cluster.

d. Rating, by the computer system, each candidate intent or goal for each intent or goal name.

e. Selecting, by the computer system, the most likely candidate intent or goal name.

f. Outputting, by the computer system, the identified intent(s), goal(s), or a combination of intent(s) and goal(s) in a digital format for use in building an AI model to be used for conversation automation platform embodiments or other platforms.

Please note that, while the simplified disclosure herein may appear to infer that Dialog Acts are at the utterance level and that turns and utterances are the same thing, this is not necessarily true. There may be, for example, multiple Dialog Acts contained in one utterance, or, in other situations, multiple utterances may comprise a single Dialog Act.

Figure 25:
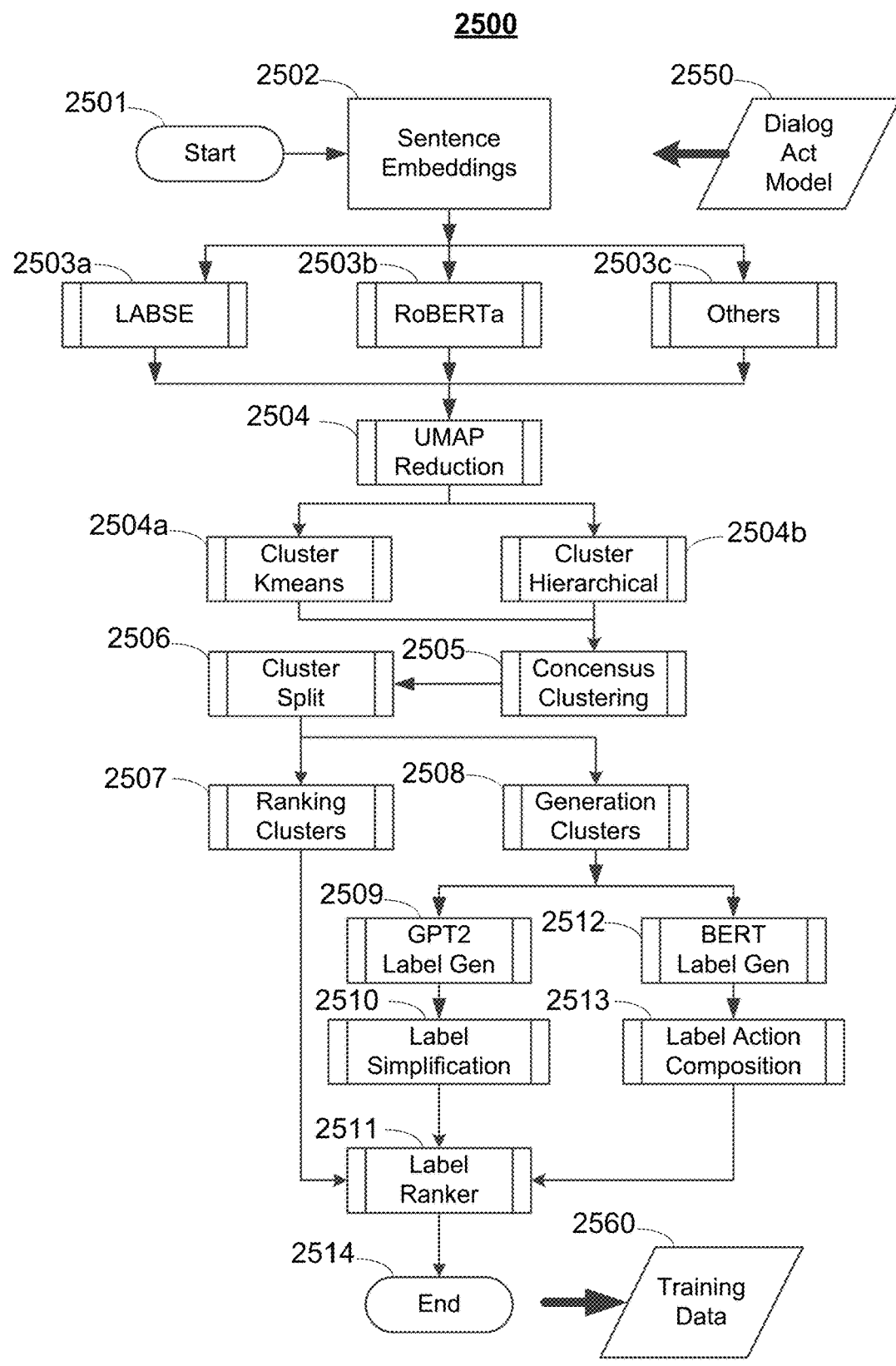
FIG. 25 sets forth a logical process, according to the invention as disclosed in the incorporated U.S. patent application Ser. No. 17/124,005, which can be instantiated for label discovery for subsequent automatic labeling of a partial or a full conversation corpus.

Referring to FIG. 25, an example logical process 2500, according to the invention as set forth in the incorporated U.S. patent application Ser. No. 17/124,005, is shown which can be instantiated for discovery of an intent or goal of a selected or specified party in an electronic interlocutor conversation. In some computing systems, the same logical process can be instantiated multiple times, simultaneously, to discover goals and intents of multiple parties in a single conversation, one specific party in multiple conversations, or multiple parties in multiple conversations. Each instantiation is searching for goals and intents for a particular, specified party. In at least some embodiments of the present invention, any number of instantiations may be made for any number of parties and any number of conversations.

The example process starts 2501 by encoding 2502 sentence embeddings in the recorded utterances contained in the Dialog Act Model 2550 data structure for the party on which the instance of the process is executing. This step of encoding may be performed using one or more processes such as Language-Agnostic Bidirectional Encoder Representations from Transformers Sentence Encoding (LABSE) 2503a, Robustly Optimized Bidirectional Encoder Representations from Transformers Pretraining Approach (RoBERTa) 2503b, and others 2503c, such as but not limited to Multilingual Universal Sentence Encoder for Semantic Retrieval (m-USE), Language-Agnostic SEntence Representations (LASER) library for calculating multilingual sentence embeddings, and other masked language model (MLM) processes for NLP pre-training such as the original Bidirectional Encoder Representations from Transformers (BERT). Dimensionality reduction 2504 is performed on the encoded embeddings using a process such as Uniform Manifold Approximation and Projection (UMAP), or suitable alternatives (e.g., t-Distributed Stochastic Neighbor Embedding (t-SNE), etc.)

Next, the example logical process 2500 groups the digitally-recorded conversations according to similarity into clusters using one or more clustering processes, such as but not limited to Kmeans clustering 2504a and hierarchical clustering 2504b, The clusters are combined using one or more processes such as clustering ensembles, clustering aggregation, or preferable, a consensus clustering process 2505.

Next, the data in the clusters is split 2506 into data for candidate label generation 2508 and for label ranking 2507, The cluster generation data 2508 is used to generate multiple candidate labels for the conversation utterances using one or more processes such as but not limited to Open AI's Generative Pre-trained Transformer 2 (GPT-2) 2509, BERT 2512, and the labels are simplified 2510, and label actions are composed 2513 using models for statistical identification of most relevant verbs for the label, to ensure labels include actions whenever relevant.

Finally, according to this example logical process 2500, the candidate labels for each turn in the conversations are ranked 2511 for most likely to least likely. The ranking is performed using a statistical model trained using a very large dataset for semantic similarity matching of labels to full sentences. The labels and ranks are then exported and output into training data 2560.

It bears noting that the foregoing example label discovering process can be performed on multi-party conversations as well as agent-client interactions and conversations. In at least one embodiment of the present invention, any number of instantiations may be made for any number of parties and any number of conversations in other embodiments.

Figure 26:
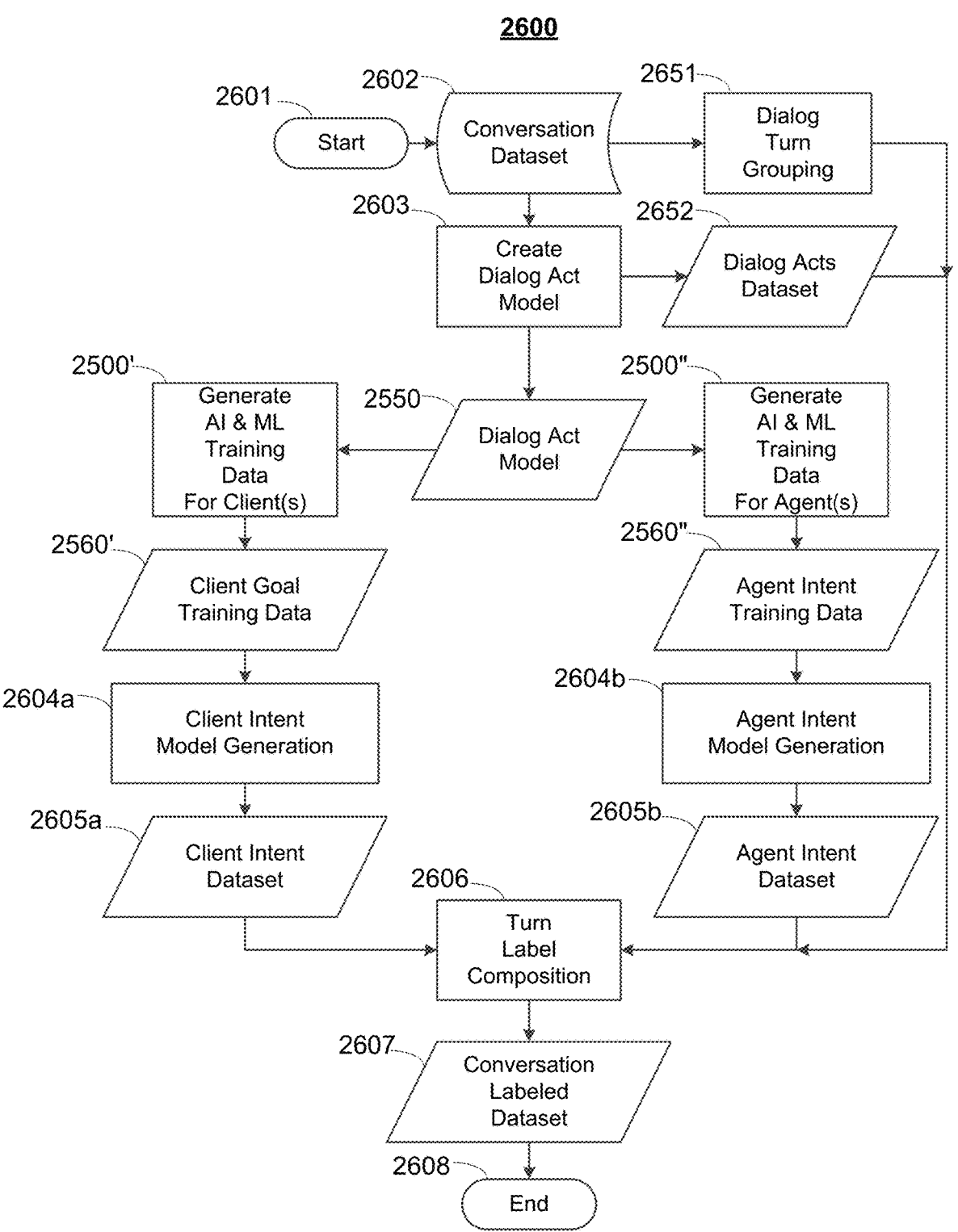
FIG. 26 sets forth a control logical process, according to the invention as disclosed in the incorporated U.S. patent application Ser. No. 17/124,005, which can be instantiated on a per-party basis to automatically label intentions, goals, or both intention and goals.

Referring now to FIG. 26, an example control logical process 2600, according to the as set forth in the incorporated U.S. patent application Ser. No. 17/124,005, is set forth which instantiates a per-party logical goal-intention discovery process such as, but not limited to, the example process 2500 of FIG. 25. A dialog act model 2550 is a classifier for conversation sequence of utterances that predicts a dialog act label from a set of predetermined labels, such as 21 available labels in one particular embodiment. This classification allows identification of utterances in the conversation where a client explains their goal, where an agent requests information or when an agent provides information/solution to the question 2550', 2550". These data subsets are input into each instantiation of the intent and goal discovery process 2500. [0096] For example, one instantiation 2500' may be directed at discovering the goal and/or intent of a particular client (e.g., a caller, a responder, a text message party, etc.) in one conversation or across multiple conversations. In another instantiation 2500", the requests for information from the agent (e.g., representative, operator, etc.) may be determined within one conversation or across multiple conversations. Any number of instantiations may be made for any number of parties and any number of conversations. Each instantiation results in a training dataset 2560, 2560', and 2506", from which client and agent intent models 2605a, 2605b are generated 2604a, 2604b, respectively, wherein the models are stored in computer-readable datasets.

These intent models are statistical classifiers trained with the identified set of goals/intents and that can be applied to full datasets (including future data from the same type of conversation corpus) and automatically identify the best labels for the conversations. One or multiple labels are identified by the system for each utterance from each party in the conversation. With these lower level labels, a higher level label is computed 2606 for each turn in the conversation dataset 2602, that combines information from all party labels considering the aggregation rules of party utterances into conversation turns 2651, resulting in a conversation dataset 2607 which is fully labeled for each utterance and turn level, that can further be used for automated insight discovery or automated conversation reply system.

Please note that, while the foregoing examples were set forth using statistical intent models, other models, such as heuristic, and other classification methods may be employed in other embodiments. In some embodiments, two or more types of models may be used together.

Figure 27:
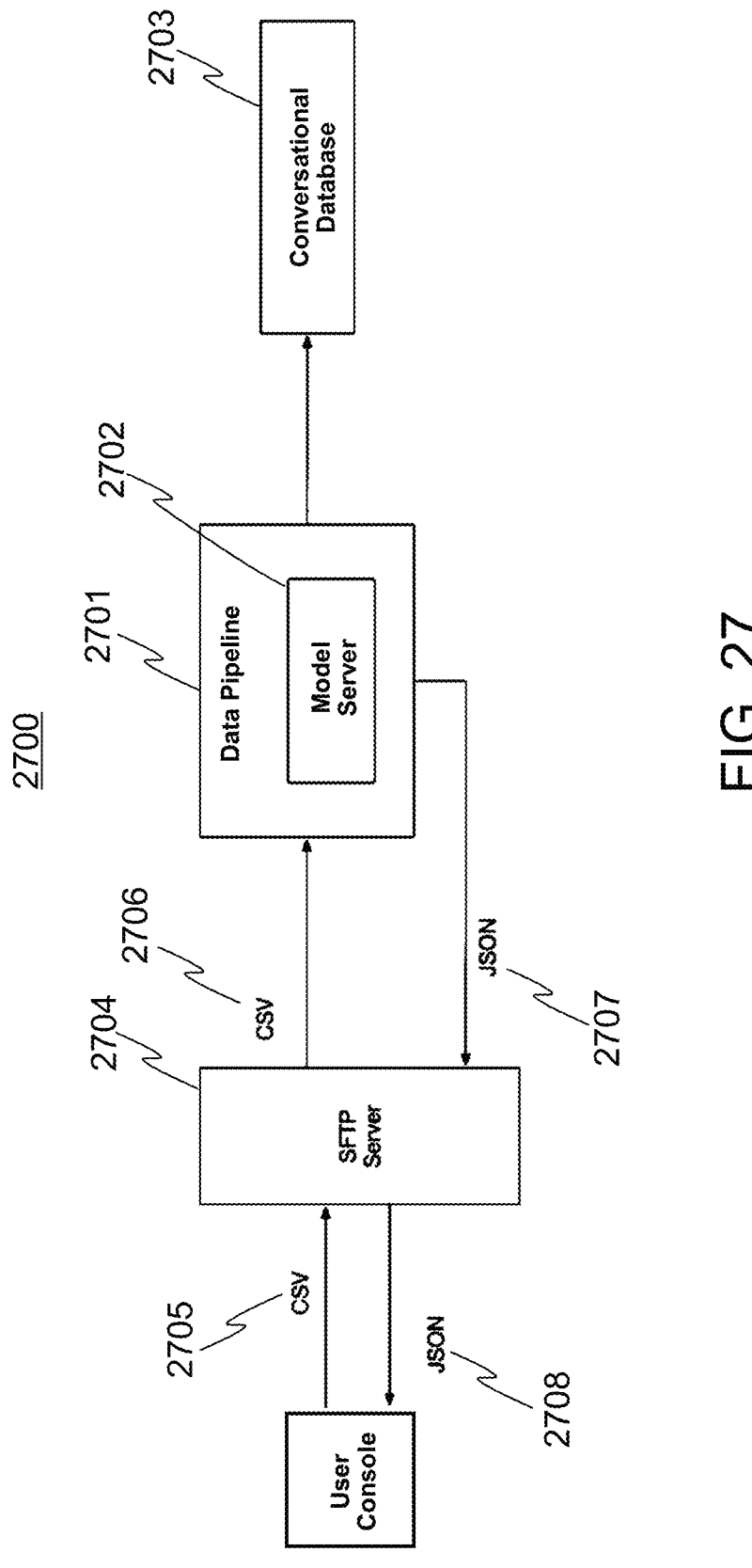
FIG. 27 illustrates main functional components for data input, processing, and output of an example embodiment according to the present invention.
Figure 28:
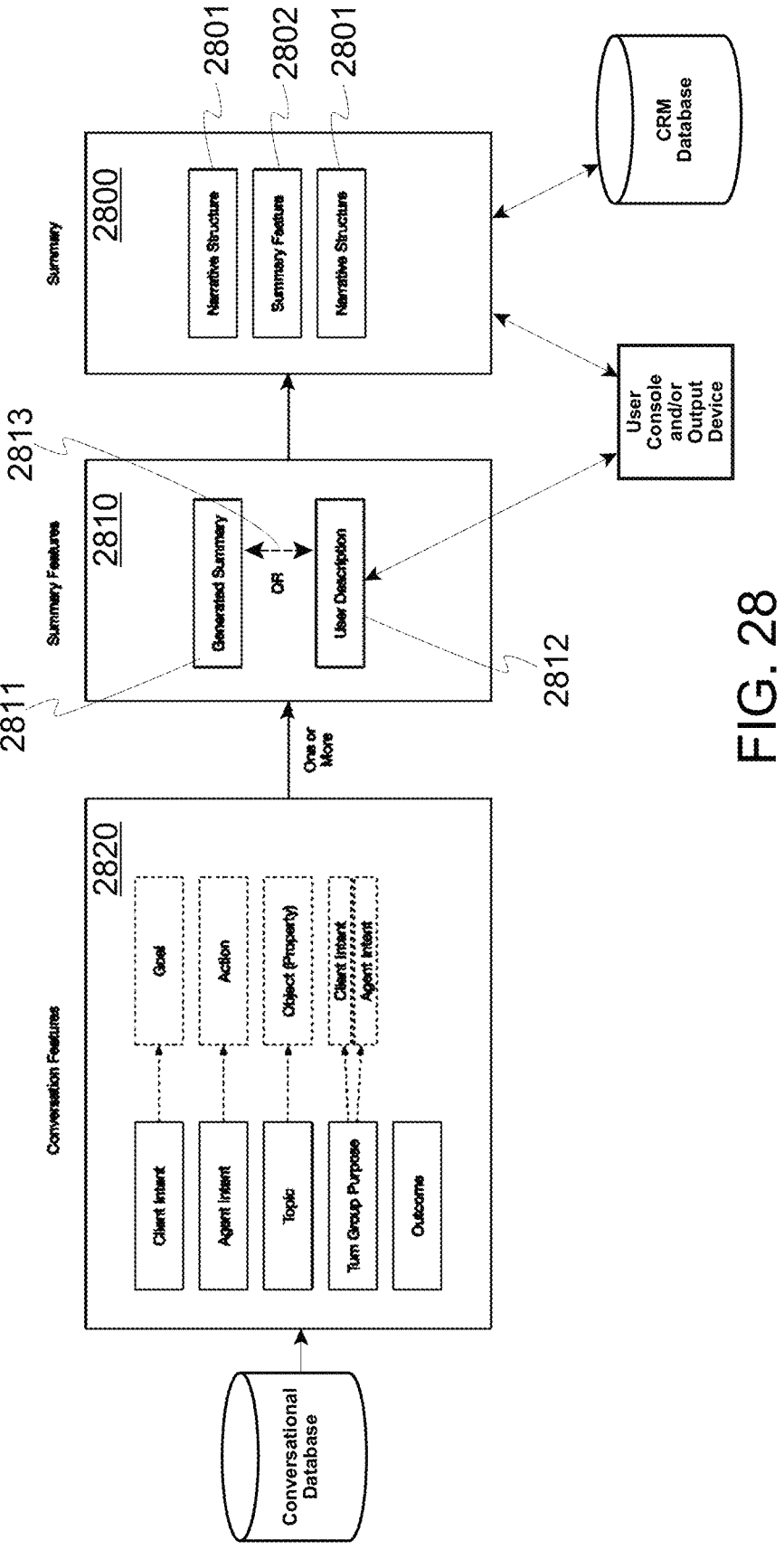
FIG. 28 sets forth a functional organization of components for a Conversation Summarizer (or summary generator) according to at least one embodiment of the present invention.

Conversation Summarizer. Turning now to the present invention which may, in some embodiments, be realized in conjunction with the foregoing systems and methods according to the related and incorporated U.S. patents and patent applications, and which may, in other embodiments, be realized in conjunction with alternative automated interlocutor conversation platforms, details of at least one embodiment are shown in FIGS. 27 and 28.

As previously described, conversational data input into an AI-based Conversation Analysis platform according to the present invention may include digitally transcribed voice calls, text message conversations, online chat conversations, email conversations, and the like. In at least one embodiment, machine learning (ML) models operate in the AI-based Conversation Analysis platform where the input is formatted in comma separated values (CSV) and the output is formatted as a JavaScript Object Notation (JSON). As shown in FIG. 27, in at least one example embodiment 2700, CSV files 2705 are uploaded to a Secure FTP (SFTP) server 2704 by the user. The CSV files are automatically ingested 2706 and enriched by the AI-based Conversation Analysis platform pipeline 2701, which includes a conversation model server 2702. The output data from the AI-based Conversation Analysis platform pipeline 2701 is then saved to a database 2703 for subsequent navigation, exploration and visualization by the customer. The output data is also saved, in at least this example embodiment, to the SFTP server 2704 as JSON 2707, 2708 where the user can download the output. In at least one embodiment, all personally-identifiable information (PII) is removed from the input CSV by the user prior to uploading the information to the SFTP server.

Users can then use exported data as input into their own chatbot, data science tools, and data analytics platforms. With the methods, systems and features described in the related and incorporated patents and patent applications, user can also engage data discovery visualization tools for business analysts, data scientists, and chatbot developers, such as but not limited to those previously discussed regarding FIGS. 17 and 19-24. Companies may periodically or continuously upload their customer conversations so they can see how customer behavior changes over time and to spot new and important business insights.

As previously mentioned, many business transactions occur through conversation on the phone, via text, messaging, and other electronic means. Oftentimes, contact center agents help customers achieve their goals, such as paying a bill, executing a transaction, or shipping a product, using one or more of the aforementioned electronic means. At the conclusion of customer conversation, contact center agents are often required to summarize the conversation in their own words. This information is usually stored in a Customer Relationship Management (CRM) System as notes related to the conversation. This process takes precious agent time and is inconsistent from one agent to another. The present invention discloses a system that creates a conversation summary automatically using components of Artificial Intelligence and machine learning. These conversation summaries are produced in human readable form or in an encoded digital form which can be readily rendered into human readable form by well known software tools such as wordprocessors, web browsers, and custom user interfaces. The encoded digital summaries are preferably, but not necessarily, stored in the CRM system, saving agent time, providing consistent note levels of breadth and details, and further allowing higher level analysis using similar data from multiple conversations.

A Conversation Summary describes a conversation that occurred between two or more interlocutors. A Conversation Summary often consists of at least one customer stated goal, one or more actions that the agent and/or customer took during the conversation, and at least one Outcome or result of the actions related to the Goal. The Conversation Summarizer Component may, in at least one embodiment, be realized in conjunction with an AI-based communications analysis system as previously set forth herein, and it may be realized with other such systems, as well. In other embodiments, a Conversation Summarizer Component may be realized as an independent tool which receives certain inputs and produces certain outputs (summaries) without particular integration to or dependency on any particular chatbot system, IVR system, CRM system, etc.

Assuming the availability of many of the foregoing functions, processors, and data structures or the equivalent thereof, and referring now to FIG. 28, the output Summary 2800 is derived from one or more selected Summary Features 2802 in combination with Narrative Structure 2801. Summary Features 2802 may comprise fragments of sentences or whole sentences, in natural language text, which may include additional structured data such as named entity markup or semantic markup such as Abstract Meaning Representation ("AMR"). The one or more Narrative Structures 2801 may occur before one or more Summary Features 2802, after Summary Features 2802, between Summary Features 2802, and all combinations thereof.

Each Summary Feature 2802 which is available for selection into the Summary 2800 may be automatically generated 2811 by the system using one or more of aforementioned system components if operating in cooperation with a system such as that described herein, or through automatic extraction of certain information from the output of the aforementioned components if operating as a separate tool.

In some embodiments, users may be allowed to create Summary Features 2812 or portions of Summary Features, or to edit and modify 2813 automatically generated or extracted Summary Features.

Each automatically generated Summary Feature 2811 is composed using one or more Conversation Features 2820, such as those generated in the output JSON of the foregoing system embodiments. These Conversation Features 2800 may include, but are not limited to, one or more of the following: Client Intents, Agent Intents, Topics, Turn Group Purposes, and Outcomes. Not all Summaries will be generated using all of these Conversation Features, of course, because some real conversations have only a few of these features.

Figure 29:
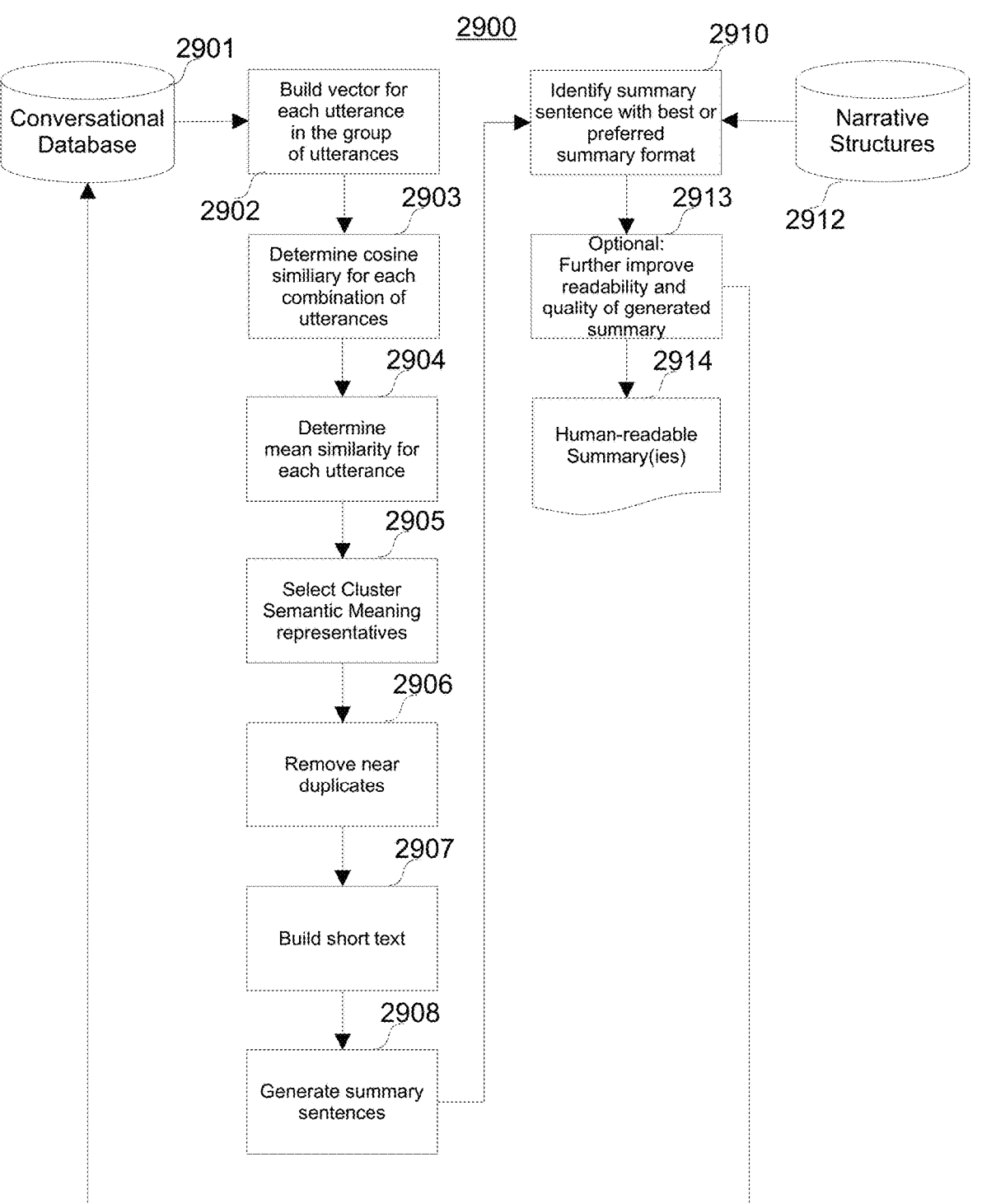
FIG. 29 shows an example logical process to generate one or more Summaries according to at least one embodiment of the present invention.

Summary features may be generated automatically in different ways. In one embodiment the system could generate one summary feature for specific conversational features. For example generate a summary description of a specific agent or client goal or intent from the training data for client goals 2560', or agent intents 2560". One or more representative sentences that are closest to the centroid of the relevant cluster(s) can then be automatically summarized using one of the known techniques for summarizing text in a manner similar to the generation of the short labels for each cluster, for example using models such as the example process 2900 shown in FIG. 29, suitable for execution by a computer processor, for creating summary features from clusters of intent utterances is shown as follows:

a. build 2902 a vector for each utterance in the group of utterances from the conversational database 2901, such as by using a deep learning model trained for generating semantic sentence vectors;

b. calculate 2903 a cosine similarity of each combination of utterances in the group;

c. for each utterance, calculate 2904 a mean similarity;

d. select 2905 the top number N largest mean similarities, which corresponds to the utterances that better represent the cluster semantic meaning (i.e., it can be seen as the utterances closest to the centroid on the sentence vector space);

e. remove 2906 any near duplicates from the centroids list the group of centroid utterances, such as by employing a Levenshtein metric (near duplicates are utterances that only differ by some small number of characters, that could be, for example the existence or absence of stop words, which, for the objective of summarization, are less interesting that utterances having the same meaning but different surface forms);

f. build 2907 a short text, such as by concatenating the list of N utterances in the group, including an interlocutor name;

g. generate 2908 from the short text multiple summary sentences, such as by using with a beam search decoding strategy of a deep learning generative model trained with datasets of long texts and summaries, and optionally including one or more narrative structures 2912;

h. identify 2910 from the multiple summary sentences the one summary sentence that follows a best or a preferred summary format (e.g., for client intents, summaries that describe the action relative to the client may be preferred, "The client has requested a new card"). and i. optionally, improve 2913 the readability and quality of the summary (or summaries), such as by applying a set of heuristics and pattern matching rules, and/or by applying pattern matching rules to improve the quality of summaries for special tokens like named entities.

In another embodiment, summary features can be automatically generated from the actual conversational text directly.

For example, the text from certain regions of the conversation, for example the conversational text from the interlocutors in the topic negation phase of the dialog 308 can be used to generate a summary of the negotiation phase. A separate summary feature can be generated for the discussion phase 309, etc. In a simpler embodiment, the text from contiguous regions of the conversation (e.g. the 'start', 'middle', and 'end' of the conversation) could be used to generate a summary feature for each region. In this example embodiment, the text for each region is transformed into a summary feature using a sequence-to-sequence that uses a transformer network architecture for both the encoder and decoder and uses a beam search decoding strategy to generate the coherent narrative text.

For example, in many conversations held in an in-bound contact center, the Client initiates the call, so presumably, every Conversation Summary would have at least one Client Intent, unless the Client misdialed or changed their mind about the conversation before it was concluded. However, in an outbound contact center with an automatic dialer calls the client and initiates the conversation, there may be no Client Intent, where there may presumably be at least one Agent Intent, such as to follow up on a previous conversation, inquire about an overdue payment, etc.

In at least one embodiment, a Primary Client Intent may be designated and labeled as a Goal. Some Agent Intents may also represent Actions that the Agent takes on behalf of a customer; for example sending a copy of a bill or looking up a customer transaction. One or more of these Conversation Features 2820 are received by the Summary Features processor, which automatically generates one or more Summary Features 2810, which are then selected and combined with one or more Narrative Structures to yield one or more Conversation Summary(ies) 2800 which are rendered into human readable form (e.g., printed to paper, shown in a computer screen, etc.), or stored in an electronic file (e.g. summary entry into a CRM system, word processor file, text file, database entry, etc.), or both rendered to human readable form and stored in an electronic file.

For example, consider the following short conversation conducted by chat on a bank's website:

Agent: Hi, my name is Ron, how may I help you today?

Client: Hi Ron, I need to find out why my deposit isn't showing in my checking account yet?

Agent: Ok, I'm sorry it's not there yet, and I can help you with that. What's your name?

Client: Carl Robertson.

Agent: Hi Carl, what's your checking account number and Password?

Client: It's 123456 and the pin is VacationFun4Me.

Agent: Ok, I'm looking at it now, and I don't see any deposits in the last week in your checking account. But, I see a deposit 2 days ago in your savings account. Could that be it?

Client: Oh, no, yes, I must have used the wrong deposit slip. Is it about $1500?

Agent: Yes. Would you like me to transfer that to checking for you?

Client: That would be great?

Agent: Ok, it's in your checking account now. Is there anything else I can do for you?

Client: No, thanks for your help!

Agent: Have a good day, and thanks for being a customer.

Client: Ok, you have a good day, too. Bye.

From this short conversation, the bolded text shows the following Conversation Features 2820 that would be extracted from the interchange:

Topic: missing deposit

Client Intents=>Goal: where's my deposit

Agent Intent=>Action: found deposit in related account

Agent Intent=>Action: transferred to intended account

Outcome: Client satisfied; problem resolved.

The Summary Features generated might be as follows: missing deposit located in related account; transferred to intended account; problem resolved; client satisfied. In this example the summary features were created from the conversation features using natural language processing techniques known to those skilled in the art to resolve coreference, for example by recognizing that the noun phrase 'missing deposit' was the same entity as the 'deposit' found in the related account.

Combining a Narrative Structure "Client contacted agent about . . . " as a preamble, and then transforming the Narrative Structure and Summary Feature(s), the entire generated summary may read as follows:

"Client contacted Agent about a missing deposit to checking account. Agent found matching deposit in savings account. Agent obtained permission to transfer deposit from savings account to checking account. Client agreed problem was resolve satisfactorily."

While some embodiments may simply append or combine the Narrative Structure with the Summary Feature(s), the result may be somewhat crude and, in some instances, difficult to interpret by a user. At least one embodiment according to the present invention uses a generative language model to transform summary elements, such as 'A B C D E', where A B C D and E are disjointed sentences, and produces an output of the same meaning that has narrative structure with resolved pronouns, tense, aspect, etc. In one embodiment of this approach a model is trained as a translation task between a source 'language' of disjoint text statements and a source 'language' of coherent summaries. The training uses a parallel corpus of source texts comprising concatenated summary features interleaved with narrative structure, and target texts comprising coherent summaries. The model is a sequence-to-sequence that uses a transformer network architecture for both the encoder and decoder. Other embodiments may use other available processes for similar results which are available to those with ordinary skill in the art.

The resulting summary or summaries may then be output into a human-readable form 2914. such as a printed report or computer display, and/or may be recorded or stored digitally for access by another computer or another computer process, such as storing into the conversational database 2901.

Computing Platform. The "hardware" portion of a computing platform typically includes one or more processors accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces may be provided, as well as specialty interfaces for specific applications. If the computing platform is intended to interact with human users, it is provided with one or more user interface devices, such as display(s), keyboards, pointing devices, speakers, etc. And, each computing platform requires one or more power supplies (battery, AC mains, solar, etc.).

CONCLUSION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention and related inventions have been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process(es). The foregoing example embodiments do not define the extent or scope of the present invention, but instead are provided as illustrations of how to make and use at least one embodiment of the invention.

What is claimed is:

1. A method implemented on a computing device for automatically generating a computer-based conversation summary note related to a digitally-recorded interlocutor conversation, the method comprising:

accessing, by a computer processor, a data corpus having a plurality of digitally-recorded conversations of text-based interlocutory conversations;

extracting, by a computer system, one or more Conversation Features from one or more regions of the digitally-recorded interlocutory conversations;

creating, by a computer system, one or more Summary Features from the one or more extracted Conversation Features, wherein the one or more Conversation Features comprise disjointed phrases;

generating and transforming, by a computer system, at least one Summary Note by combining one or more Narrative Structures with the one or more Summary Features, wherein the transforming employs a generative language model which preserves meaning while resolving one or more narrative elements selected from the group consisting of pronouns, tense, and aspect; and digitally outputting, by the computer system, the at least one Summary Note.

2. The method of claim 1 wherein the digitally-recorded conversations of text-based interlocutory conversations comprises at least one labeled value.

3. The method of claim 2 wherein the extracting of one or more Conversation Features further comprises extracting from at least one labeled value.

4. The method of claim 2 wherein the at least one labeled value comprises one or more labels selected from the group consisting of a Client Intent, an Agent Intent, a Topic, a Turn Group Purpose, and an Outcome.

5. The method of claim 2 wherein the at least one labeled value comprises one or more values labels selected from the group consisting of a Goal, an Action, an Object, and a Property.

6. The method of claim 1 further comprising transforming, by the computer system, the Summary Note to improve readability, agreement and preferred format.

7. The method of claim 1 wherein the creating of the one or more Summary Features comprises, at least in part, automatically creating at least one Summary Feature.

8. The method of claim 1 wherein the creating of the one or more Summary Features comprises, at least in part, automatically creating at least one Summary Feature from a Summary Feature received from a user console.

9. The method of claim 1 further comprising receiving one or more modification commands from a user console to change a Summary Feature.

10. The method of claim 1 wherein the generating of at least one Summary Note further comprises combining with at least one Narrative Structure.

11. The method of claim 10 wherein the combining with at least one Narrative Structure comprises appending a preamble.

12. The method of claim 10 wherein the combining with at least one Narrative Structure comprises combining with a postlude.

13. The method of claim 1 wherein the digitally outputting of the at least one Summary Note comprises storing the Summary Note to a Customer Relationship Management Database.

14. The method of claim 1 wherein the digitally outputting of the at least one Summary Note comprises printing the Summary Note to a printer.

15. The method of claim 1 wherein the digitally outputting of the at least one Summary Note comprises displaying the Summary Note on a user console.

16. A computer program product for automatically generating a computer-based conversation summary note related to a digitally-recorded interlocutor conversation, comprising:

one or more tangible, computer-readable computer memory devices which are not a propagating signal per se; and computer instructions encoded by the one or more tangible, computer-readable computer memory devices configured to cause one or more processors to, when executed:

access a data corpus having a plurality of digitally-recorded conversations of text-based interlocutory conversations;

extract one or more Conversation Features from one or more regions of the digitally-recorded interlocutory conversations;

create one or more Summary Features from the one or more extracted Conversation Features, wherein the one or more Conversation Features comprise disjointed phrases;

generate and transform at least one Summary Note by combining one or more Narrative Structures with the one or more Summary Features, wherein the transforming employs a generative language model which preserves meaning while resolving one or more narrative elements selected from the group consisting of pronouns, tense, and aspect; and digitally output the at least one Summary Note.

17. A system for automatically generating a computer-based conversation summary note related to a digitally-recorded interlocutor conversation, comprising:

one or more computer processors;

one or more tangible, computer-readable computer memory devices which are not a propagating signal per se; and computer instructions encoded by the one or more tangible, computer-readable computer memory devices configured to cause the one or more processors to, when executed:

access a data corpus having a plurality of digitally-recorded conversations of text-based interlocutory conversations;

extract one or more Conversation Features from one or more regions of the digitally-recorded interlocutory conversations;

create one or more Summary Features from the one or more extracted Conversation Features, wherein the one or more Conversation Features comprise disjointed phrases;

generate and transform at least one Summary Note by combining one or more Narrative Structures with the one or more Summary Features, wherein the transforming employs a generative language model which preserves meaning while resolving one or more narrative elements selected from the group consisting of pronouns, tense, and aspect; and digitally output the at least one Summary Note.

* * * * *